(12) United States Patent
Burris et al.

(10) Patent No.: US 8,965,827 B2
(45) Date of Patent: Feb. 24, 2015

(54) RULES EXECUTION PLATFORM SYSTEM AND METHOD

(75) Inventors: Richard S. Burris, Dallas, TX (US); Johan Gielstra, Austin, TX (US); Steve J. Westerholm, Windsor, CT (US); S. Alex Carmack, Conventry, CT (US); Sunil B. Pandit, Austin, TX (US); Bruce E. Glaze, Henderson, TX (US)

(73) Assignee: Computer Sciences Corporation, Irving, TX (US)

( * ) Notice: Subject to any disclaimer, the term of this patent is extended or adjusted under 35 U.S.C. 154(b) by 239 days.

(21) Appl. No.: 13/154,353

(22) Filed: Jun. 6, 2011
(Under 37 CFR 1.47)

(65) Prior Publication Data
US 2012/0254090 A1   Oct. 4, 2012

Related U.S. Application Data

(60) Provisional application No. 61/469,801, filed on Mar. 30, 2011.

(51) Int. Cl.
*G06N 5/02*   (2006.01)

(52) U.S. Cl.
CPC ........................ *G06N 5/025* (2013.01)
USPC .......................................... 706/47

(58) Field of Classification Search
None
See application file for complete search history.

(56) References Cited

U.S. PATENT DOCUMENTS

| | | | |
|---|---|---|---|
| 6,539,404 B1 | 3/2003 | Ouchi | |
| 6,928,487 B2 | 8/2005 | Eggebraaten et al. | |
| 7,631,299 B2 | 12/2009 | Kannenberg | |
| 7,809,698 B1 | 10/2010 | Salz et al. | |
| 2002/0129059 A1 | 9/2002 | Eck | |
| 2005/0060365 A1 | 3/2005 | Robinson et al. | |
| 2006/0020530 A1 | 1/2006 | Hsu et al. | |
| 2006/0235935 A1 | 10/2006 | Ng | |
| 2007/0203881 A1 | 8/2007 | Schaad et al. | |
| 2008/0168109 A1 | 7/2008 | Gauray et al. | |
| 2008/0256047 A1 | 10/2008 | Dettinger et al. | |
| 2008/0288235 A1* | 11/2008 | Dettinger et al. | ............... 703/23 |
| 2010/0017185 A1 | 1/2010 | Bade et al. | |
| 2010/0042425 A1 | 2/2010 | Watson et al. | |
| 2010/0106546 A1 | 4/2010 | Sproule | |
| 2010/0121805 A1 | 5/2010 | Haynes et al. | |

OTHER PUBLICATIONS

PCT Search Report and Written Opinion for corresponding application No. PCT/US2012/031644, dated Jun. 15, 2012.
CSC Brochure, Visual Product Modeling System (VP/MS), Crack the Code for Administering Calculations and Business Rules, 2009.

* cited by examiner

*Primary Examiner* — Alan Chen
(74) *Attorney, Agent, or Firm* — Nelson Mullins Riley Scarborough, LLP

(57) ABSTRACT

Methods, mediums, and systems are described for providing a platform coupled to one or more rules engines. The platform may provide runtime rule services to one or more applications. Different rules engines may be used for different types of rules, such as calculations, decisions, process control, transformation, and validation. Rules engines can be added, removed, and reassigned to the platform. When the platform receives a request for services from an application, the platform selects one of the rules engines to handle the request and instructs the selected rules engine to execute the rule. The rules engine may be selected automatically. The platform may be implemented through a service-oriented architecture.

22 Claims, 21 Drawing Sheets

```xml
<?xml version="1.0" encoding="ASCII"?>
<decisiontable:DecisionTableRule xmlns:xsi="http://www.w3.org/2001/XMLSchema-instance"
    xmlns:decisiontable="http://fsg.csc.com/uw/decisiontable/2009"
    xmlns:ruledata="http://fsg.csc.com/uw/ruledata/2009" name="Case Manager Queue Assignment" id="_IINqg-vNEd6NYqq9bvFO1w">
  <decisionParam id="_IINggOvNEd6NYqq9bvFO1w" nextDecisionParam="_IINggevNEd6NYqq9bvFO1w">
    <ruleDataItemRef xsi:type="ruledata:RuleDataElement" href="Case Assignment.ruledata#_Db0i80vEEd6ZitFs6u9VaA"/>
  </decisionParam>
  <decisionParam id="_IINggevNEd6NYqq9bvFO1w" nextDecisionParam="_IINgguvNEd6NYqq9bvFO1w">
    <ruleDataItemRef xsi:type="ruledata:RuleDataElement" href="Case Assignment.ruledata#_PiBJoevNEd6NYqq9bvFO1w"/>
  </decisionParam>
  <decisionParam id="_IINgguvNEd6NYqq9bvFO1w" decisionParamType="OUTPUT">
    <ruleDataItemRef xsi:type="ruledata:RuleDataElement" href="Case Assignment.ruledata#_Ux4900vNEd6NYqq9bvFO1w"/>
  </decisionParam>
  <decisionRows id="_IINghOvNEd6NYqq9bvFO1w">
    <decisionCell id="_IINghuvNEd6NYqq9bvFO1w" type="INPUT" decisionParamRefID="_IINggOvNEd6NYqq9bvFO1w" expression="Annuity">
      <successor id="_IINgi0vNEd6NYqq9bvFO1w" type="INPUT" decisionParamRefID="_IINggevNEd6NYqq9bvFO1w">
        <successor id="_IINgiuvNEd6NYqq9bvFO1w" type="OUTPUT" decisionParamRefID="_IINgguvNEd6NYqq9bvFO1w"/>
      </successor>
    </decisionCell>
```

© Computer Sciences Corporation

```
</decisionCell>
</decisionRows>
<decisionRows id="_IINqi-vNEd6NYqq9bvFOlw">
<decisionCell id="_IINqjevNEd6NYqq9bvFOlw" type="INPUT" decisionParamRefID="_IINqgOvNEd6NYqq9bvFOlw" expression="Variable
<successor id="_IINqj-vNEd6NYqq9bvFOlw" type="INPUT" decicionParamRefID="_IINggevNEd6NYqq9bvFOlw">
<successor id="_IINqkevNEd6NYqq9bvFOlw" type="OUTPUT" decisionParamRefID="_IINgguvNEd6NYqq9bvFOlw"/>
</successor>
</decisionCell>
</decisionRows>
<decisionRows id="_IINqkuvNEd6NYqq9bvFOlw">
<decisionCell id="_IINqlOvNEd6NYqq9bvFOlw" type="INPUT" decicionParamRefID="_IINqgOvNEd6NYqq9bvFOlw" expression="Application
<successor id="_IINqluvNEd6NYqq9bvFOlw" type="INPUT" decicionParamRefID="_IINggevNEd6NYqq9bvFOlw" expression="Life Uno
<successor id="_IINqmOvNEd6NYqq9bvFOlw" type="OUTPUT" decisionParamRefID="_IINgguvNEd6NYqq9bvFOlw">
</successor>
</decisionCell>
</decisionRows>
© Computer Sciences Corporation
```

FROM FIG. 19A

FROM FIG. 19B

↓

```
<decisionRows id="_IINqmevNEd6NYgq9bvFO1w">
  <decisionCell id="_IINqm-vNEd6NYgq9bvFO1w" type="INPUT" decicionParamRefID="_IINgg0vNEd6NYqq9bvFO1w">
    <successor id="_IINqnevNEd6NYgq9bvFO1w" type="INPUT" decicionParamRefID="_IINggevNEd6NYqq9bvFO1w" expression="Contract Ch
    <successor id="_IINqm-vNEd6NYgq9bvFO1w" type="OUTPUT" decicionParamRefID="_IINgguvNEd6NYqq9bvFO1w"/>
  </successor>
  </decisionCell>
</decisionRows>
</decisiontable:DecisionTableRule>
© Computer Sciences Corporation
```

FIG. 19C

RULES EXECUTION PLATFORM SYSTEM AND METHOD

CROSS-REFERENCE TO RELATED APPLICATIONS

This application claims the benefit of U.S. patent application Ser. No. 61/469,801, filed on Mar. 30, 2011 and entitled "Rules Execution Platform System and Method," the entire disclosure of which is hereby incorporated by reference as if set forth verbatim herein and relied upon for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

FIELD OF THE INVENTION

The present invention relates generally to a platform for facilitating communication between one or more applications and one or more rules engines.

BACKGROUND OF THE INVENTION

A rules engine is a software system that executes one or more rules in a runtime environment. A rules engine may be provided as a component of a larger system in order to handle the processing of rules required by other components of the system. The syntax used to communicate with a rules engine typically varies with each different rules engine.

SUMMARY OF THE INVENTION

The present invention recognizes and addresses the foregoing considerations, and others, of prior art construction and methods.

In that regard, one aspect of the present invention provides a computer-implemented method for facilitating communication between one or more applications and one or more rules engines. The method comprises providing a platform protocol including a platform syntax for defining a rule. The platform protocol comprises an association between predetermined criteria relating to the rule and predetermined one or more rules engines. The method further comprises defining rules according to the platform syntax, wherein each rule is associated with metadata, and associating each rule with a predetermined rules engine based on application of the predetermined criteria. The association of each rule with a predetermined rules engine is stored in the metadata associated with the rule. The method further comprises translating each rule defined in the step above into a rules engine syntax for the predetermined rules engine and storing the translated rule from the step above and the associated metadata from the step above in a rules repository.

In another embodiment, a request may be received from an application indicating that a first rule should be executed. The request may include the first rule or a description of the first rule. Metadata associated with the first rule may be retrieved along with a translated rule for the first rule. The metadata may describe a predetermined rules engine associated with the first rule. The predetermined rules engine may be identified based on the metadata, and the first rule may be transmitted to the predetermined rules engine for execution. The predetermined rules engine may execute the first rule to generate a result. The result may be transmitted to the application.

In other embodiments, electronic device readable mediums and systems are provided for facilitating communication between one or more applications and one or more rules engines.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 19A, 19B, and 19C illustrate an exemplary rule represented as an XML metadata file in accordance with an embodiment of the present invention.

Figure 1:
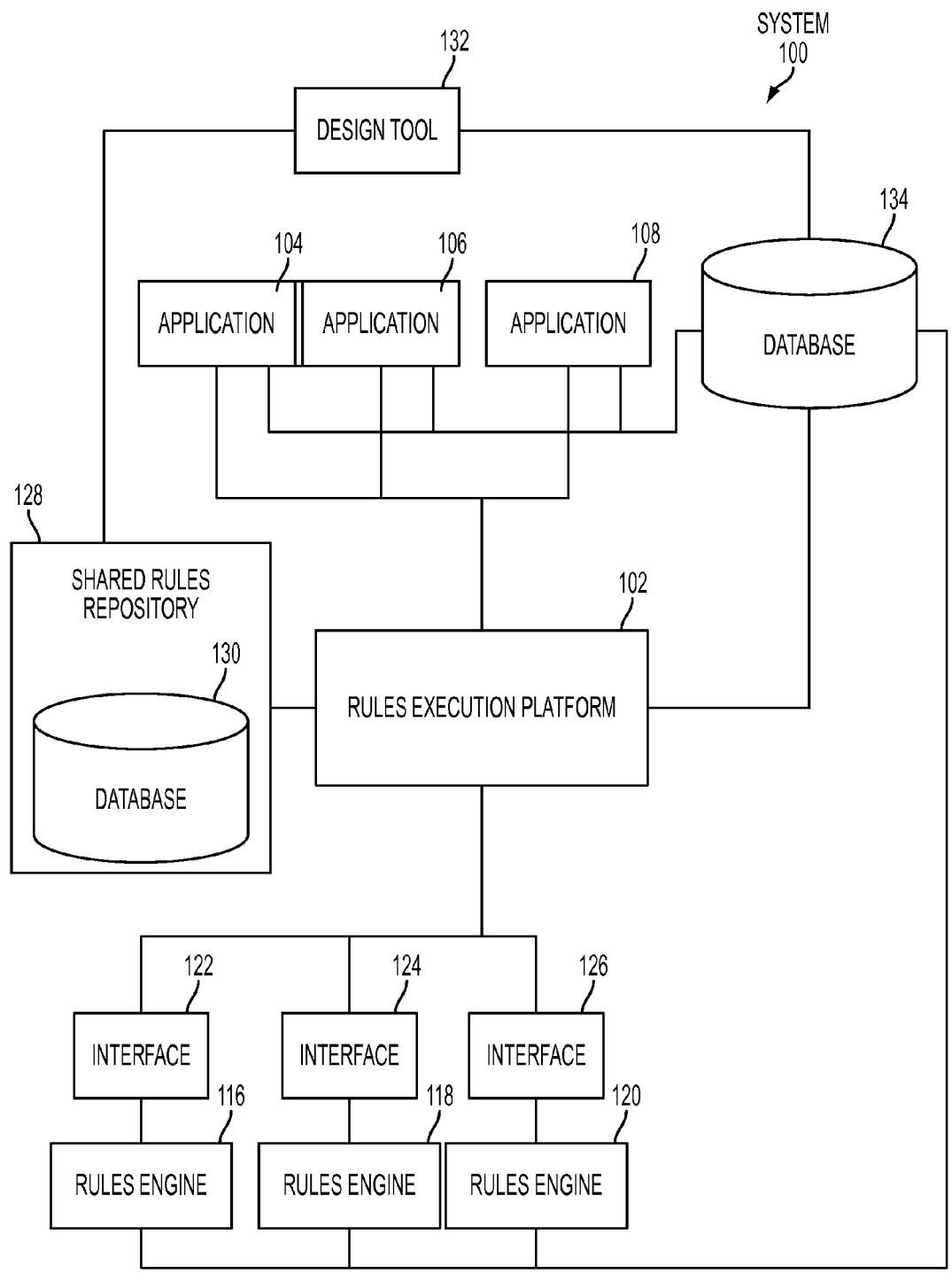
FIG. 1 is a diagrammatic representation of a software system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Methods, mediums, and systems are described for providing a platform coupled to one or more rules engines. The platform may provide runtime rule services to one or more applications. As should be understood, different rules engines may have different functions and/or organizations that may make the respective engines more suitable or efficient for use with respective different types of rules. Thus, for example, a given rules engine might be better suited for "if/then" type rules, whereas another rules engine might be more suitable for mathematical-based rules. In presently-described embodiments, a system associates rules with rules engines at the time the rules (either at the time of definition or creation of an executable) are created, so that when an application calls the rule, an execution platform executes the rule via a predetermined rules engine. The association between the rule and the rules engine occurs within the system according to a predetermined criteria, without the application user or rule-creator needing to know which rules engine is or will be used. In the presently-described embodiments, the association between rules and rules engines is defined by the application user, and may be triggered by rule type or service environment as described below, but this association could be based on other criteria, such as specific functions performed by the rule.

Figure 4:
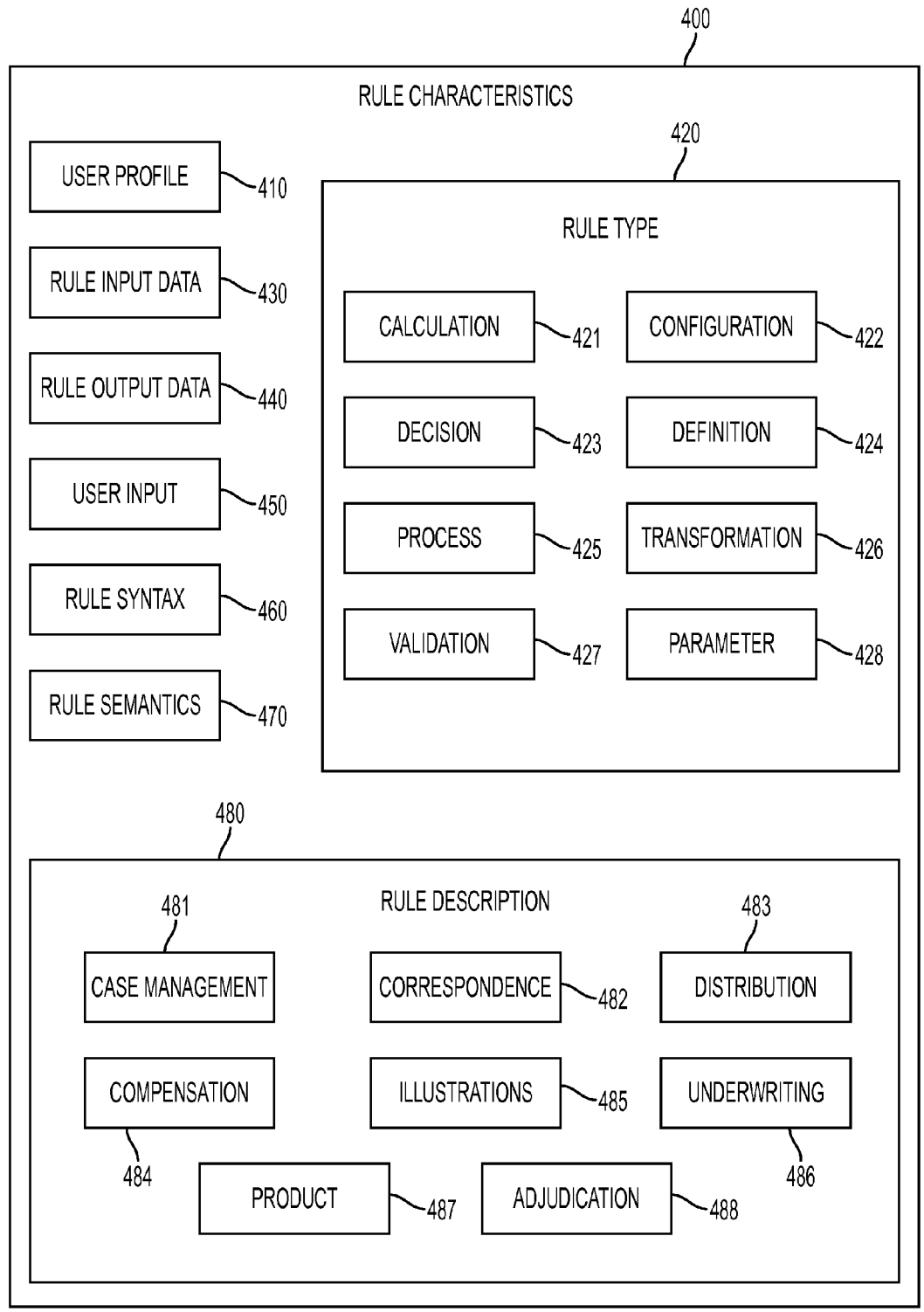
FIG. 4 depicts exemplary rule characteristics for use in accordance with an embodiment of the present invention.

In this regard, and referring to FIG. 4, the presently-described embodiments classify rules as decision rules 423, parameter rules 428, process rules 425, or transformation rules 426, but it should be understood that such classification can vary and is provided herein for purposes of example only. For example, decision rules 423 may define specific criteria that are used to control the behavior of a business service or application. Examples of rules of decision rule type 423 include conditional processing that is embedded within a business process or function; role-based access control policies that control user or system access to protected resources; cross-field edits; and data format and data type syntax. Rules involving calculations 421 may be classified as decision rules 423 or may be categorized separately should system 100 be configured so that one rules engine handles calculation rules, while another handles decision rules.

A rule of parameter type 428 describes the terms that are significant to a business process. Rules of the parameter type may take the form of, for example: insurance product definitions; rate factors; company constants; and configuration files. A rule of the process type 425 may govern a business process or workflow activity. Examples of rules of the parameter type 425 include: underwriting case routing; service and process choreography; and user interface navigation. Additional examples of parameter-type rules may include configuration 422, definition 424, and validation 427 rules. A rule of the transformation type 426 may govern the transformation of data from one format to another. Examples of rules of the transformation type 426 include data format conversions and object maps.

It should be understood that the types of rules described above are exemplary in nature and that there may be additional or fewer rule types depending on the desired configuration of the system. In the present embodiment, for example, calculation and validation rules are included in the other four types of rules described above, but it should be understood that these may be considered as separate rule types.

In one presently-described embodiment, a design tool is used to create rules, the execution of which is then handled by a rules execution platform. The design tool is configured to identify a user based on information provided by an external system, and determine which of a predetermined set of roles is associated with the user's identity. Parameters associated with these roles define which, if any, predetermined type of rule the user will be permitted to construct using the design tool. For each rule type, the design tool provides certain options regarding inputs, outputs, and functions available to the user to select in building rules of that type. The system allows a user to select which type of rule the user wishes to build, and optionally may restrict the user's choice based on the user's role, and, upon receiving the user's choice, presents the user with a set of rule-building options associated with that rule type. The system may then deploy the rule, i.e., translate the rule to an executable form. The environment is comprised of one or more applications running on one or more system servers dedicated to a service or function performed by an organization. In exemplary embodiments, the system may define which rules engine will be used to execute a given rule, based on rule type and/or environment. Thus, when the environment is identified at deployment, the system translates the rule into the syntax of the corresponding rules engine, and the system later executes the rule using that rules engine when an application calls the rule.

Accordingly, based on a predetermined relationship between a user's identity and a set of functional roles, the system determines what type(s) of rule the user is permitted to create. The relationship between the user's identity and a set of system roles determines whether the user has permission to create, modify, test, and/or deploy rules. Based on the type of rule the user creates and/or the environment in which the rule will be used, the system determines a rules engine to associate with the user-created rule. The association of individuals to system and functional roles, and thereby the association of individuals with rule types the individuals may be allowed to create within the system and the association of rule types and/or environments to rules engines, are effected as part of the construction of a system for a business entity or other organization and may be selected at the organization's discretion. The presently-described system may be configured with a predetermined set of roles, each independently identified in a system database. The number of roles, rule types, and environments, and the manner in which they are identified, are not in-and-of-themselves critical to the present invention, and the system may be configured according to the organization's wishes. Also as part of the construction process, and at the organization's discretion, each of the functional roles is associated with one or more of the predetermined rule types, so that association of a rule-constructing user with a functional role determines the type of rule the user is permitted to construct.

With its internal computer system, the organization identifies each user in some manner, e.g., an identification number or acronym. An administrator of the organization may be provided sufficient rights to update a table in the system database that associates these individual identities with system and/or functional roles, thereby defining whether a user has permission to create a rule and, if so, which rule types an individual is permitted to construct. For example, a given user's function within an organization that operates one or more applications may involve the creation of rules that are all, or predominantly, of a certain type, for example transformation rules, while another user that operates the same or different applications may perform functions requiring that user to create different rules, for example decision rules. In this instance, the organization may define a first functional role having the ability to create only transformation rules, on one hand, and a second functional role having the ability to create only design rules, on the other. The organization administrator, in turn, assigns these two users to their respective functional roles in the database. The administrator also assigns system roles to the users that identify whether the respective user has permission to access, create, modify, test, and/or deploy rules of the type associated with that user's functional role(s).

When a given user accesses the design tool through the organization's computer system, the computer system's operating system identifies the user and passes to or gives access to that identity to the design tool. The design tool retrieves identifiers for the system role associated with the user from the database, thereby determining what rule design features and functions are made available to the user. When the user thereafter uses the design tool to access or create a rule, the design tool presents the user with an interface configured to thereby allow the user to access, create, or modify rules only of the type associated with the user's functional role or, if the user's functional role is associated with multiple rule types, presents the user with an option by which the user can select a rule type. Once the user makes the choice, the design tool presents the user with the interface configured for the selected rule.

The system database also has a table that associates rule types and/or environments with rules engines. This association is also part of the system construction for the specific organization. That is, the organization may have its own preferences for use of a given rules engine associated with the system, as discussed below, for rules of a given type and/or for use in a given environment, and the system database has a table that associates each rule type and/or each predefined environment with a respective such rules engine according to the organization's instructions. After a user defines a rule through the design tool and at the time the organization deploys the rule to a given environment, the system checks this table and determines the rules engine associated with the rule type and/or environment, translates the rule to the syntax of the identified rules engine, and associates the newly-translated rule with the associated rules engine through metadata associated with the translated rule. When the platform thereafter receives a request for services from an application requesting the rule's execution, the platform identifies the rules engine from the metadata and instructs the selected rules engine to execute the rule. Rules engines can be added, removed, and reassigned to the platform. In one embodiment, the platform is implemented through a service-oriented architecture.

FIG. 1 is a diagrammatic representation of a system 100 comprising a rules execution platform 102 and a design tool 132. System 100 may include, or may operate in conjunction with, one or more applications 104, 106, and 108 that utilize the rules execution platform 102, as described below.

System 100 also comprises, or may operate in conjunction with, one or more rules engines 116, 118, and 120 operatively connected to the rules execution platform 102. In one embodiment, the connection between the rules engines 116, 118, and 120 and the rules execution platform 102 may be accomplished via respective interfaces 122, 124, and 126. Although not illustrated, it should be understood that each of applications 104, 106, and 108 may also be associated with an interface through which another application or system may interact with the respective application.

Each of the applications 104, 106, and 108 may be a software application configured to transmit a request that a rules engine execute a rule. It should also be understood that each of rules engines 116, 118, and 120 are software systems configured to execute rules, e.g., as requested by such applications, in a runtime environment. Examples of suitable rules engines, for instance, include the VISUAL PRODUCT MODELING SYSTEM (or "VP/MS") rules engine offered by Computer Sciences Corporation of Falls Church, Va., the open source DROOLS rules engine maintained by Red Hat of Raleigh, N.C., the open source OPENRULES engine maintained by OpenRules, Inc. of Edison, N.J., and the WEBSPHERE ILOG BUSINESS RULE MANAGEMENT SYSTEMS offered by International Business Machines of Armonk, N.Y.

Each of interfaces 122, 124, and 126 is a set of rules, specifications, and/or syntax definitions that allows a system to communicate with rules engines 116, 118, and 120, respectively. For instance, an interface may be an application programming interface ("API"), a dynamic link library ("DLL"), or other shared library that allows communication with the system associated with the particular interface. It should be understood that the specific configuration, arrangement, and/or implementation of each of the interfaces varies depending on the underlying rules engine (or application) to which the interface corresponds. Thus, in the presently-described embodiments, rules execution platform 102 is configured to communicate with a rules engine via the associated interface regardless of the interface's specific configuration, arrangement, or implementation, as explained in more detail below. Moreover, in those embodiments in which the rules execution platform communicates with applications and/or rules engines through one or more interfaces, the particular configuration and implementation of a given interface may vary and are not, in and of themselves, critical to such embodiments. For example, where one or more of the rules engines 116, 118, and 120 is any of the DROOLS, OPENRULES, or ILOG rules engines described above, the corresponding interface adheres to Java Specification Request 94 ("JSR-94") Specification. The JSR-94 Specification, which is maintained by the Java Community Process at http://jcp.org/en/jsr/detail?id=94, defines the manner by which any system, including rules execution platform 102, may communicate with rules engines that adhere to the specification. It should be understood that rules execution platform 102 may be configured to communicate with such rules engines in the manner set forth in the JSR-94 Specification, based on the explanation, definition, or standards of the interface provided with the corresponding rules engine. Thus, rules execution platform 102 transmits requests to a rules engine in a syntax defined by the interface associated with the engine, as explained in more detail below, without knowledge of the interface's arrangement or implementation.

System 100 further comprises at least one shared rules repository 128 that includes a database 130 for storing rules, as described in more detail below. Design tool 132 is configured to facilitate creation of rules, as explained below, and is operatively connected to repository 128 to store such rules once created. One or more databases 134 comprising data used by one or more of applications 104, 106, and 108 may also be operatively connected to rules execution platform 102 and design tool 132. Although database 134 is depicted as a single structure in FIG. 1, those skilled in the art should appreciate that database 134 may include multiple databases that may be located and supported by separate pieces of hardware.

System 100, and more specifically design tool 132, allows a user to write one or more rules for execution by any of rules engines 116, 118, and 120, where the association of the rule to a rules engine is defined by a predetermined criteria such as described herein. As explained in more detail below with respect to FIG. 2, design tool 132 is configured to allow a user to create a rule to be written in a syntax defined by the operation of system 100, and in particular by the operation of design tool 132 and rules execution platform 102. That is, system 100 defines a platform syntax that is independent of the rules engines, so that application users need familiarize themselves only with the platform syntax in order to create rules that are ultimately executed by the rules engines 116, 118, or 120, and need not know the identity of the rules engine that will ultimately execute the rules they create. At the time a rule is created, and in presently-described embodiments deployed, the system identifies one of rules engines 116, 118, or 120 that will execute the rule according to the predetermined criteria, for example based on rule type and/or environment, translates the rule defined according to the platform syntax into a format that is compatible with the identified rules engine (as described below with respect to FIG. 2), and stores the relationship between the rule and the rules engine in metadata associated with the translated rule. A platform protocol thus comprises the platform syntax and the rule/rules engine associations. When one of applications 104, 106, or 108 thereafter requires the rule to be executed in order to generate a result, the application requests rules execution platform 102 to execute the rule and return the result to the requesting application in the manner described below with respect to FIG. 3. In response, rules execution platform 102 selects the translated rule it associated with the requested rule according to the platform protocol, executes the rule in conjunction with the rules engine, thereby processing the request from the application, and returns any result to the application.

Figure 6:
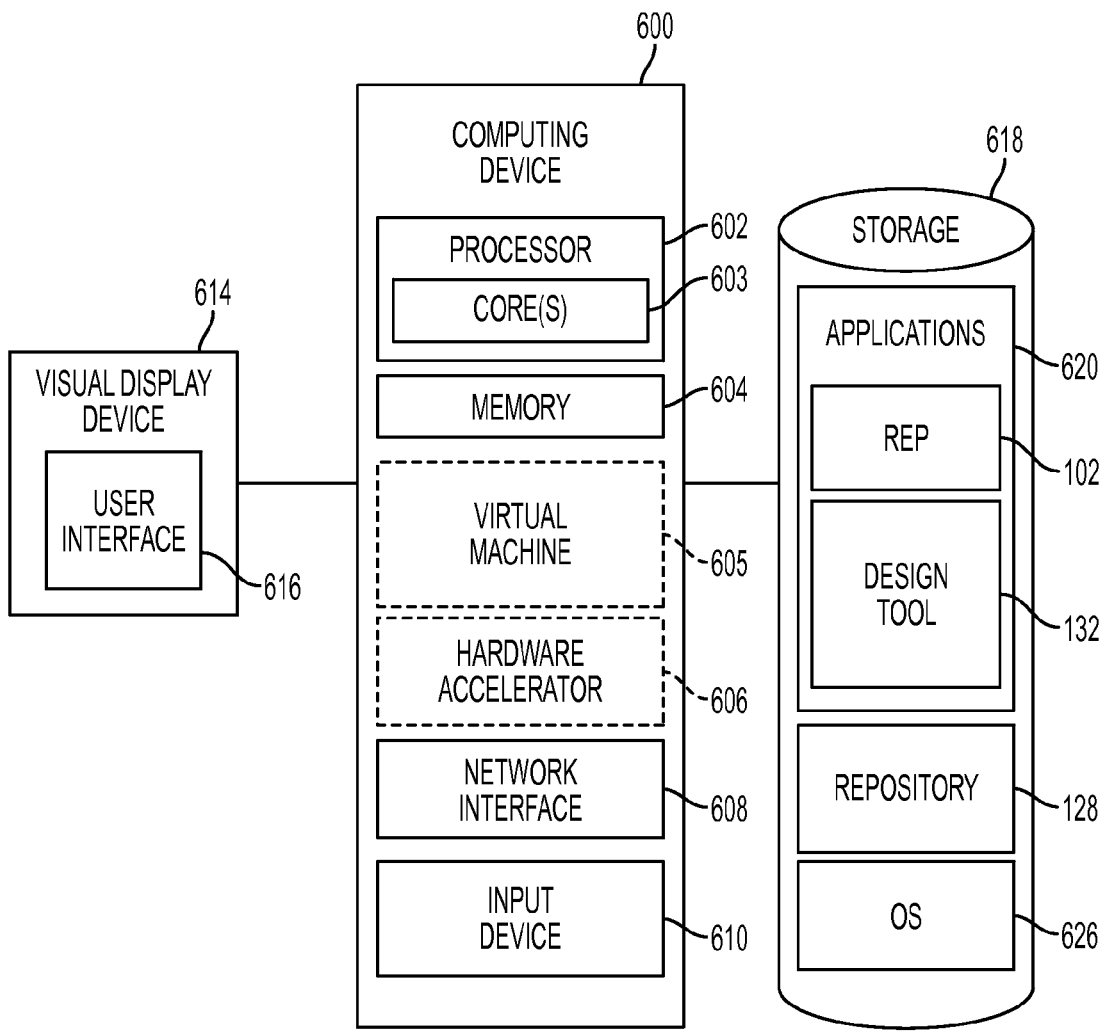
FIG. 6 depicts an exemplary electronic device suitable for use in accordance with an embodiment of the present invention.

System 100 may be practiced in one or more suitable electronic devices. FIG. 6, for example, depicts an exemplary electronic computing device 600 suitable for practicing the embodiments described herein. Computing device 600 may take many forms, including but not limited to one or more computer, workstation, server, network computer, quantum computer, optical computer, Internet appliance, mobile device, a pager, a tablet computer, a smart sensor, application specific processing device, etc.

The implementation of FIG. 6 is illustrative and may take other forms. For example, an alternative implementation of computing device 600 may have fewer components, more components, or components that are in a configuration that differs from the configuration of FIG. 6. The components of FIG. 6 and/or other figures described herein may be implemented in hardware based logic, software based logic, and/or logic that is a combination of hardware and software based logic (e.g., hybrid logic); therefore, the components of FIG. 6 and/or other figures are not limited to a specific type of logic.

In this embodiment, computing device 600 comprises a processor 602, having one or more cores 603 and memory 604. Processor 602 may include hardware or software based logic to execute instructions on behalf of computing device 600. In one implementation, processor 602 may include one or more processors, such as a microprocessor. In one implementation, processor 602 may include hardware, such as a digital signal processor ("DSP"), a field programmable gate array ("FPGA"), a Graphics Processing Unit ("GPU"), an application specific integrated circuit ("ASIC"), a general-purpose processor ("GPP"), etc., on which at least one or more components of system 100 can be executed. In another implementation, core(s) 603 may be configured for executing software stored in memory 604 or other programs for controlling computing device 600.

Computing device 600 may include one or more tangible nontransitory computer-readable storage media for storing one or more computer-executable instructions or software for implementing exemplary embodiments. For example, memory 604 included in association with computing device 600 may store computer-executable instructions or software, e.g., instructions for implementing and processing every module of a programming environment. Memory 604 may include a computer system memory or random access memory ("RAM"), such as dynamic RAM ("DRAM"), static RAM ("SRAM"), extended data out RAM ("EDO RAM"), etc. Memory 604 may include other types of memory as well, or combinations thereof.

In one implementation, processor 602 may include a virtual machine ("VM") 605 for executing the instructions loaded in memory 604. Virtual machine 605 can be provided to handle a process running on multiple processors so that the process appears to be using only one computing resource rather than multiple. It should be understood that VM 605 may be configured to span across multiple electronic devices similar to computing device 600. Virtualization can be employed in computing device 600 so that infrastructure and resources in the computing device can be shared dynamically. Multiple VMs 605 may be resident on processor 602.

Computing device 600 may also include a hardware accelerator 606, such as implemented in an ASIC, FPGA, or the like, in order to speed up the general processing rate of the computing device.

Additionally, computing device 600 may include a network interface 608 to interface to a local area network ("LAN") or a wide area network ("WAN"), such as the Internet, through a variety of connections including, but not limited to, standard telephone lines, LAN or WAN links (e.g., T1, T3, 56 kb, X.25), broadband connections (e.g., integrated services digital network ("ISDN")), frame relay, asynchronous transfer mode ("ATM"), wireless connections (e.g., 802.11), high-speed interconnects (e.g., InfiniBand, gigabit Ethernet, Myrinet), or any combination of the above. Network interface 608 may include a built-in network adapter, network interface card, personal computer memory card international association ("PCMCIA") network card, card bus network adapter, wireless network adapter, universal serial bus ("USB") network adapter, modem, or any other device suitable for interfacing computing device 600 to any type of network capable of communication and performing the operations described herein.

Computing device 600 may include one or more input/output ("I/O") devices 610 such as a keyboard, a multi-point touch interface, a pointing device, for example a mouse, or any combination thereof for receiving input from a user. Computing device 600 may include other suitable I/O peripherals as should be understood by those skilled in the art.

Computing device 600 may also comprise one or more visual display devices 614 operatively connected to input devices 610. A graphical user interface ("GUI") 616 may be shown on display device(s) 614 in order to present the GUI to a user.

A storage device 618 may also be associated with computing device 600. Storage device 618 may be, for example, a hard-drive, CD-ROM or DVD, zip drive, tape drive, or other suitable tangible computer readable storage medium capable of storing information, including any storage device accessible by computing device 600 via network interface 608. Storage device 618 may be useful for storing application software programs 620, rules execution platform 102, design tool 132, shared rules repository 128, database 134, and an operating system ("OS") 626. It should be understood that storage 618 may be segmented across multiple storage devices so that, for example, each of applications 620 may reside on separate storage devices. It should be understood that, in at least one embodiment, applications 620 includes rules execution platform 102 and design tool 132 and may include the other applications described above, such as applications 104, 106, and 108 and rules engines 116, 118, and 120.

As explained above, shared rules repository 128 includes one or more databases, such as database 130. Storage device 618 may also include other data stored in one or more databases or other data structures, such as database 134. The databases may be managed by database software, such as (but not limited to) Oracle Database, IBM DB2, mySQL server, and Microsoft SQL Server.

OS 626 may be any suitable operating system, such as any of the versions of the Microsoft WINDOWS operating systems, the different releases of the Unix and Linux operating systems using the Linux kernel, any version of the MACOS for computing devices provided by Apple Inc. of Cupertino, Calif., any embedded operating system, any real-time operating system, any open source operating system, any proprietary operating system, any operating systems for mobile electronic devices, or any other operating system capable of being executed by computing device 600 and performing the operations described herein. The operating system may be running in native mode or emulated mode.

Exemplary embodiments may be provided as one or more electronic-device readable programs embodied on or in one or more mediums, such as a non-transitory electronic device-readable storage medium. The mediums may be, but are not limited, to a hard disk, a compact disc, a digital versatile disc, a flash memory card, read only memory ("ROM"), programmable ROM ("PROM"), random access memory ("RAM"), magnetoresistive RAM ("MRAM"), or a magnetic tape.

In general, the electronic-device readable programs may be implemented in any programming language. Some examples of languages that may be used include Python, C, C++, C#, Java, JavaScript, a hardware description language (HDL), UML, PLC, etc. It should be understood that different components of system 100 may be implemented in different and/or multiple programming languages. For instance, each of rules engines 116, 118, and 120 may be programmed in a different programming language, each of which may be different from the program language in which design tool 132 is written. Further, the computer readable programs may be implemented in a hardware description language or any other language that allows prescribing computation. The software programs may be stored on or in one or more mediums as object code. Instructions in the programming languages may be executed by one or more processors to implement the computer readable programs described in the programming languages, or alternatively the instructions may be implemented directly by hardware components other than a processor.

Figure 7:
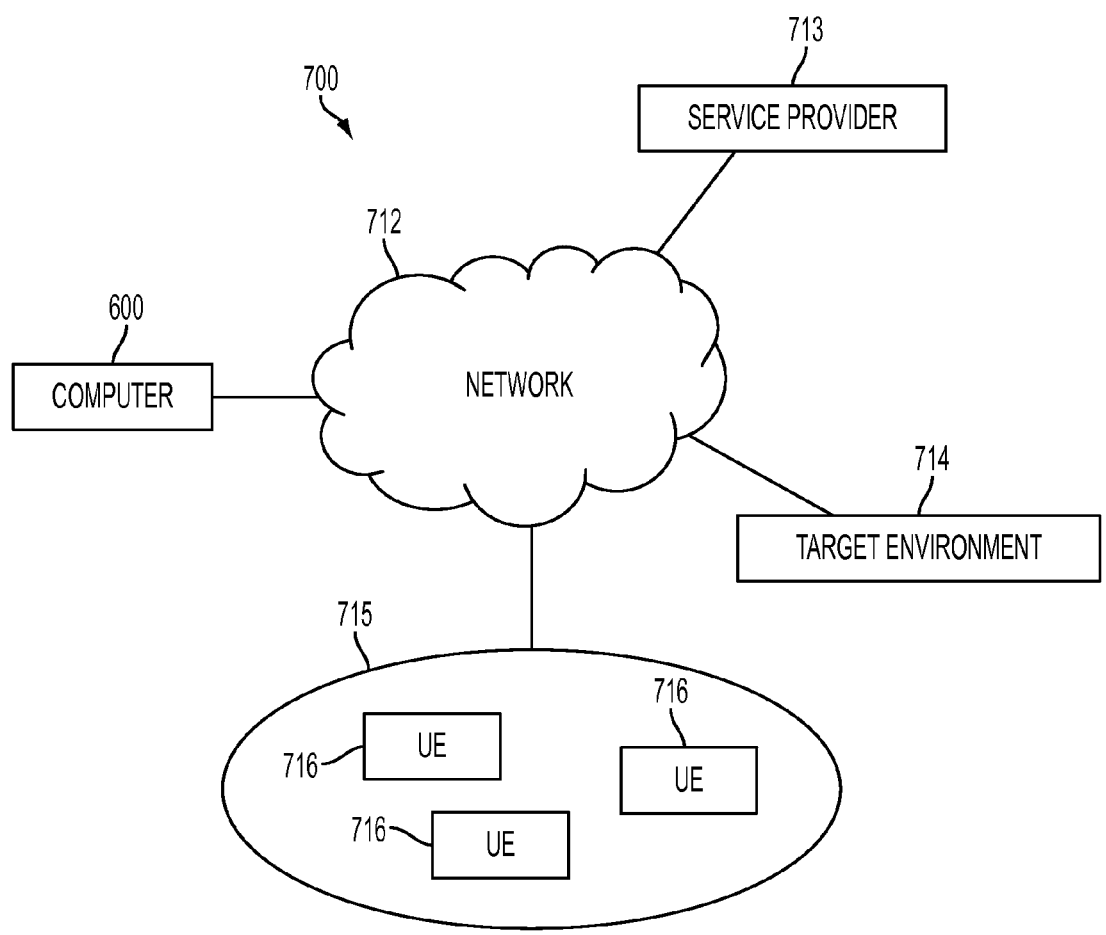
FIG. 7 depicts an exemplary network implementation of the system of FIG. 1 in accordance with an embodiment of the present invention.

FIG. 7 illustrates an exemplary distributed implementation suitable for use with the exemplary embodiments described herein. A system 700 may include computing device 600, a network 712, a service provider 713, a target environment 714, and a cluster 715, although it should thus be understood that other embodiments may include more devices, fewer devices, or devices in arrangements that differ from the arrangement of FIG. 7 without departing from the scope of the present invention.

As should be understood, network 712 transports data from a source to a destination. Embodiments of network 712 may use network devices, such as routers, switches, firewalls, and/or servers and connections (e.g., links) to transport data. Network 712 may be a hardwired network using wired conductors and/or optical fibers and/or may be a wireless network using free-space optical, radio frequency ("RF"), and/or acoustic transmission paths. In one implementation, network 712 may be a substantially open public network, such as the Internet. In another implementation, the network 712 may be a more restricted network, such as a corporate virtual network. Network 712 may thus include LANs, WANs, Metropolitan Area Network ("MAN"), wireless networks (e.g., using IEEE 802.11, Bluetooth, etc.), etc., or any combination thereof. Network 712 may use middleware, such as Common Object Request Broker Architecture ("CORBA") or Distributed Component Object Model ("DCOM"). Implementations of networks and/or devices operating on networks described herein are not limited to any particular data type, protocol, architecture/configuration, etc.

Service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf. In one embodiment, for example, each of rules engines 116, 118, and 120, along with the engine's respective interface 122, 124, or 126, may be configured as a service provider 713. In such an configuration, and referring again to FIG. 6, such rules engines would be located remotely from rules execution platform 102, design tool 132, and repository 128 but communicate with those programs via network 712 in the same manner as otherwise described herein. Similarly, target environment 714 may include a device that receives, stores, and transmits information over network 712. In one embodiment, for example, target environment 714 may comprise repository 128 and/or database 134.

Cluster 715 may include a number of units of execution ("UEs") 716 and may perform processing on behalf of computing device 600, and/or another component, such as service provider 713 and/or target environment 714. For example, in one embodiment, cluster 715 may perform parallel processing on an operation received from computing device 600. Cluster 715 may include UEs 716 that reside on a single device or chip or that reside on a number of devices or chips.

UEs 716 may include processing devices that perform operations on behalf of a device, such as a requesting device. In one embodiment, a UE can be a microprocessor, field programmable gate array ("FPGA"), and/or another type of processing device. Embodiments of UE 716 may include code, such as code for an operating environment. For example, a UE may run a portion of an operating environment that pertains to parallel processing activities. In one embodiment, service provider 713 may operate cluster 715 and may provide interactive optimization capabilities to computing device 600 on a subscription basis (e.g., via a web service).

UEs 716 provide remote/distributed processing capabilities. A hardware UE may include a device (e.g., a hardware resource) that performs and/or participates in parallel programming activities. For example, a hardware UE may perform and/or participate in parallel programming activities in response to a request and/or a task it has received (e.g., received directly or via a proxy). A hardware UE may perform and/or participate in substantially any type of parallel programming (e.g., task, data, stream processing, etc.) using one or more devices. For example, in one implementation, a hardware UE may include a single processing device that includes multiple cores, and in another implementation, the hardware UE may include a number of processors. A hardware UE may also be a programmable device, such as an FPGA, an ASIC, a DSP, etc. Devices used in a hardware UE may be arranged in substantially any configuration (or topology), such as a grid, ring, star, etc. A hardware UE may support one or more threads (or processes) when performing processing operations.

A software UE may include a software resource (e.g., a technical computing environment, a worker, a lab, etc.) that performs and/or participates in parallel programming activities. For example, a software UE may perform and/or participate in parallel programming activities in response to a receipt of a program and/or one or more portions of the program. A software UE may perform and/or participate in substantially any type of parallel programming using one or more hardware UEs. Embodiments of a software UE may support one or more threads and/or processes when performing processing operations.

The term 'parallel programming' may be understood to include multiple types of parallel programming, e.g., task parallel programming, data parallel programming, and stream parallel programming. Parallel programming may include any type of processing that can be distributed across two or more resources (e.g., software UEs, hardware UEs, processors, microprocessors, clusters, labs, etc.) and be performed at substantially the same time.

For example, in one implementation, parallel programming may refer to task parallel programming where a number of tasks are processed at substantially the same time on a number of software UEs. In task parallel programming, each task may be processed independently of other tasks executing at the same time (e.g., a first software UE executing a first task may not communicate with a second software UE executing a second task).

In another implementation, parallel programming may refer to data parallel programming, where data (e.g., a data set) is parsed into a number of portions that are executed in parallel using two or more software UEs. In data parallel programming, the software UEs and/or the data portions may communicate with each other as processing progresses.

In still another implementation, parallel programming may refer to stream parallel programming (also referred to as pipeline parallel programming). Stream parallel programming may use a number of software UEs arranged in series (e.g., a line) where a first software UE produces a first result that is fed to a second software UE that produces a second result. Stream parallel programming may also include a state where task allocation may be expressed in a directed acyclic graph ("DAG") or a cyclic graph with delays).

Other implementations may combine two or more of task, data, or stream parallel programming techniques alone or with other types of processing techniques to form hybrid-parallel programming techniques.

Those skilled in the art should appreciate that each of applications 104, 106, and 108, rules engines 116, 118, and 120, rules execution platform 102, design tool 132, shared rules repository 128, and database 134, for example, may be provided by one or more computing devices 600, and/or service providers 713, and/or may be included within target environment 714, and/or may be handled by one or more UEs 716 of cluster 715. It should be further understood that each of these components may be provided by separate computing devices, service providers, target environments, or clusters.

Applications 104, 106, and 108 may be software applications utilized by an organization or business to perform certain functions encompassed by the entity. For instance, an insurance company may execute an application to determine whether to underwrite an insurance policy. An organization may perform distinct functions or services, for example underwriting, finance, billing, or production, and one or more respective applications may be used in performing a given such function. Each function may be considered as encompassing an environment, and as used herein the term refers to the application and computer and communications systems dedicated to the performance of such a function within an organization, and/or the operation, designation, and/or classification thereof. Within an environment, an application may call rules for component functions, such as determining a proper underwriter to analyze a policy or determining pricing schedules. The business may authorize certain employees or contractors to operate the application. Certain of those individuals may have business knowledge such that they are able to define business rules that will be called by the application in its normal operation. The business may authorize those individuals with business knowledge to operate design tool 132 to define these rules, as described herein, or may designate certain employees or contractors trained to operate and maintain the system to define the rules through design tool 132, in conjunction with the individuals with business knowledge.

The insurance company, as noted above, has an internal computer system with a database with records identifying each user by an identifier (e.g., social security number, employee number, user id, or other mechanism capable of differentiating one individual from others at the business). As should also be understood, the company may assign, in the company's internal database system, users to one or more groups related to the users' functions within the organization (e.g., administrator, underwriter, customer representative, actuary, finance, accounting, human resources, or legal). The table is constructed and updated, for example, by an administrator at the company who either understands the functions performed by the various individuals or who has access to that information.

Design tool 132 relies on a data hierarchy to store rules and to provide design tool users access to rules in the database based at least in part of a user's role(s) defined by the organization's system. Referring first to rules repository 128, database 130 may be configured to store rules according to the predetermined hierarchy. In the presently-described embodiments, for example, database 130 defines the following data levels: (a) business domain, (b) business rule domain, (c) business rule subdomain, (d) category, and (e) subcategory. The number of data levels, and their description and definition, can vary as desired and may be established at construction of system 100 for a given organization according to the organization's wishes. The business domain, for example, may refer to a broad business category within which the applications are operated, for example, life insurance, casualty insurance, or homeowners insurance. The business rule domain may refer to subdivisions of the business domain. For example, if the business domain is life insurance, the business rule domain may refer to functional divisions within the life insurance organization, e.g., administrator, underwriter, customer representative, actuary, finance, accounting, human resources, or legal. The business rule subdomain, category, and subcategory refer to further hierarchical subdivisions, as determined by the organization. The particular data hierarchy, and its organization, is not in and of itself critical to the present embodiments and is provided herein for purposes of example.

Figure 2:
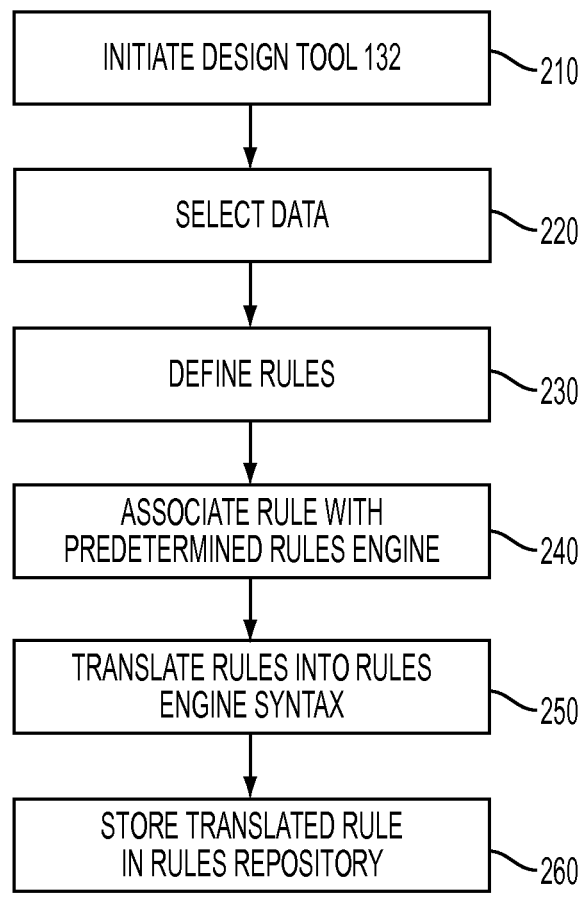
FIG. 2 is a flowchart depicting an exemplary technique for defining one or more rules in accordance with an embodiment of the present invention.

Next regarding design tool 132, FIG. 2 is a flowchart depicting an exemplary technique for defining one or more rules through the design tool for execution by one or more of rules engines 116, 118, and 120 (FIG. 1). The ensuing explanation of the exemplary technique depicted by FIG. 2 is made with reference to the components of system 100 set forth in FIGS. 1 and 6. At step 210, the user initiates design tool 132, which is presented to the user as GUI 616 by display device 614. This may be accomplished in a number of ways depending on the operating environment in which the design tool is initiated and the specific implementation of the tool. For instance, design tool 132 may be implemented as a standalone application that the user initiates by activating an icon presented via visual display device 614. In another embodiment, GUI 616 presents design tool 132 as a plug-in to another application rather than a standalone application. For instance, GUI 616 may be a plug-in to or portion of the application for which the user wishes to define a rule. That is, in order to create a rule for application 106, for example, the user elects to initiate the design tool by selecting a menu item or icon associated with the tool from within the application. In another embodiment, GUI 616 may be a plug-in to another application. For example, the plug-in may be for the MICROSOFT MANAGEMENT CONSOLE or INTERNET EXPLORER applications that accompany the WINDOWS operating system offered by the Microsoft Corporation of Redmond, Wash.

Once design tool 132 is activated, a security module component of design tool 132 identifies the user that initiated the tool. This may be accomplished in a number of ways depending on the manner by which the user activated the design tool. For instance, where design tool 132 is implemented as a plug-in to the application, the design tool has access to the user's credentials that were identified when the user activated the application. In contrast, if the user activates design tool 132 as a standalone application, the design tool may identify a user id associated with the user via the operating system of the computing device upon which the design tool has been initiated by the user, as should be understood.

Having identified the user, the design tool security module queries the user organization computer database system for data identifying functional groups to which the user is assigned, such as administrator, underwriter, customer representative, actuary, finance, accounting, human resources, or legal. Alternatively, the user's organization system may be configured to pass this information to the design tool upon the design tool's activation by the user. In one embodiment, database 134 maintains a table associating these predetermined groups with respective one or more data levels in the data hierarchy. Thus, in this example, each of the groups is associated with a corresponding business rule domain. If, for example, the design tool receives data indicating the user is associated with one of these groups, then the data defines the business domain and the business rule domain for that user. Later, when the user executes a process to create a rule and is presented with a user interface screen associated with a given selected rule type, the user interface displays selectable data entry blocks in which the user selects the data levels with which the user wishes to store the new rule in the database. Given that the user's group data identified both the business domain and business rule domain levels, the design tool automatically populates those fields, and the user need only manually populate the remaining three fields. On the other hand, assume the group data identifies multiple groups, each associated with a respective different business rule domain in the table of database 134. In that event, the group data defines the business domain but not the business rule domain, and the design tool automatically populates only the business domain block in the user interface. In the business rule domain block, the user is given the choice only of the business rule domains associated with the groups received in the data from the organization system, and the user selects the remaining three blocks as described above. In another embodiment, the user may select the data levels of the data hierarchy, as described in more detail below with respect to FIG. 14.

Having defined the data levels according to the data hierarchy, the user defines input for the rule at step 220 and proceeds to define one or more rules at 230, as described in more detail below. When the user completes the rule, the design tool stores the rule in database 130 according to the user's data level definitions. In the main user interface screen corresponding to the user's selected rule type, the user interface lists all rules stored in database 130 under the same data level path defined by the user. In another embodiment, the user interfaces lists all rules under the data level defined by any user. The user interface presents the previously stored rules so that the user can select a given rule, if desired, copy the selected rule into a workspace defined by the user interface, modify the copied rule, and store the modified rule as a new rule.

The design tool also checks database 134 to determine the system role(s) with which the identified user is assigned. As described above, at the time of construction of system 100 for the organization, the organization defines a plurality of roles. For purposes of example only, the presently-described embodiments define the following system roles: rule builder, rule designer, and technical administrator. At construction or in later modifications by an administrator at the organization, the organization defines permissions associated with each role. For example, the rule builder may be permitted to create rules, for example according to the procedure discussed below, but not to deploy rules, i.e., activate rules so that the rules are available to rules execution platform 102 for execution in response to requests from applications. In contrast, the rule designer permissions may allow the rule designer to both build rules and deploy them. Permissions associated with the technical administrator may allow that individual to perform only administrative tasks, or may allow the administrator to build and deploy rules in addition to the administrative tasks. The particular permissions associated with a given system role can vary and are generally within the discretion of the organization at the time of construction. Moreover, the organization may define more or fewer than three system roles.

The permissions associated in database 134 with each functional role may allow a user associated with the role to access one or more rules editors, each of which provides an interface through which the user may access or define rules by selecting options associated with the rules editor. Thus, each rules editor may be considered to correspond to a rule type, and the association of one or more rule editors with a functional role thereby associates the role with one or more rule types, for example decision, parameter, process, or transformation. By defining these permissions at construction, the organization can define the rule-building options desired to be available, and by exclusion unavailable, and therefore which one or more rule types, if any, are associated with each respective role. The organization can change these associations on an ongoing basis through an administrator who accesses database 134.

Figure 17:
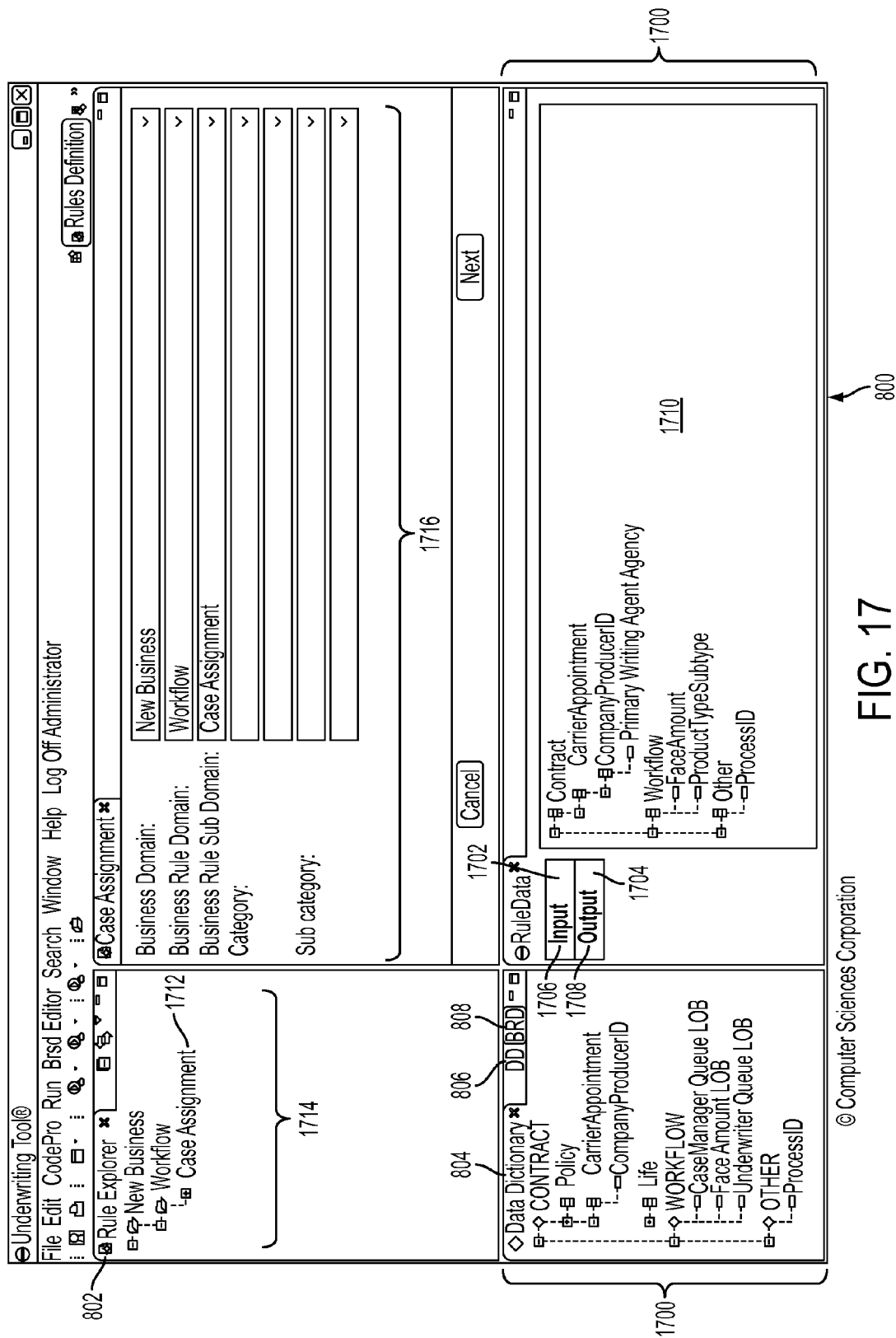

When the design tool security module identifies the user who is activating the design tool, the design tool checks database 134 and identifies the system and functional roles with which the user is associated. If the functional role is associated with more than one rule type, or rule editor, the design tool prompts the user to select one of the rule editors for the user's functional role and receives the user's selection, for example through a user interface. Given the user's selection, or if the user's functional role is associated with only one, the design tool presents the user with a rule editor user interface screen through which the user can define rules of the selected (or only) rule type and/or perform other functions (e.g., modify, test, and/or deploy rules, as defined by the permissions associated with the user's system role in database 134). FIG. 17 illustrates an exemplary screen presented to the user depending on the permissions associated with the user's system and functional roles. If the user's functional role is not associated with any rule type, the design tool user interface presents a similar screen, but without an option to define rules.

Figure 8:
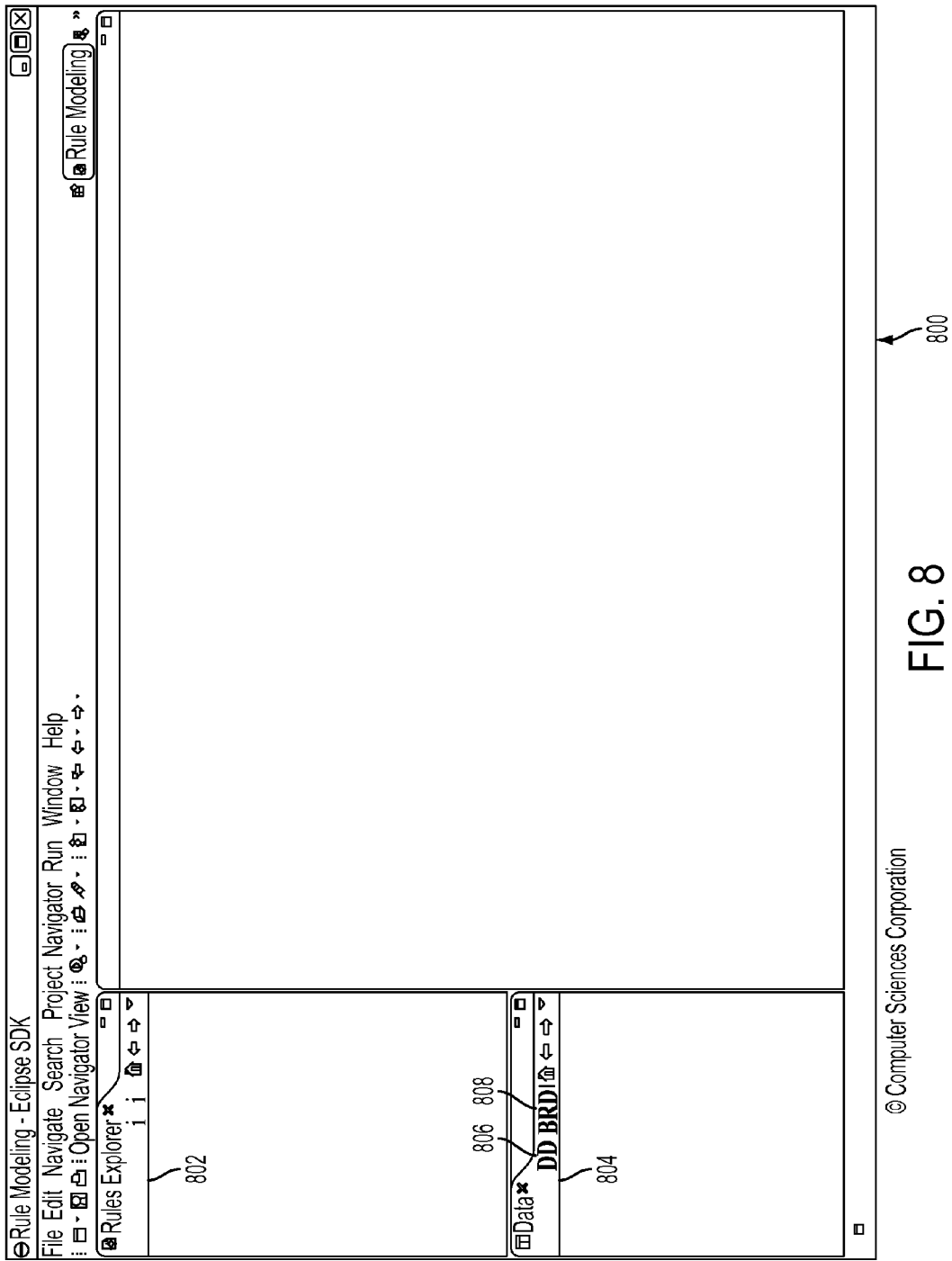
FIGS. 8 through 18 depict exemplary graphical user interfaces to be used in connection with the exemplary technique for defining one or more rules of FIG. 2.
Figure 9:
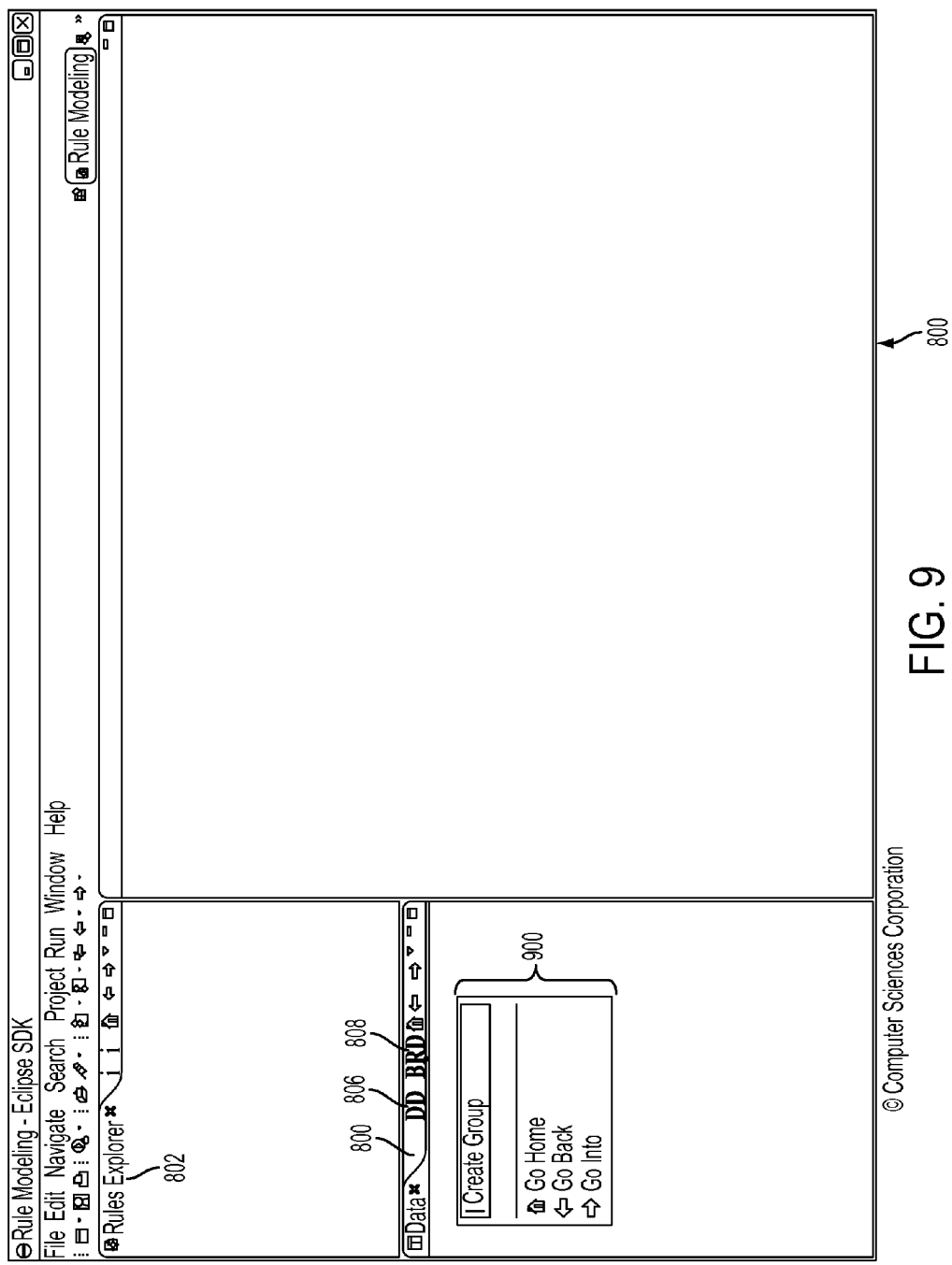

Note in FIGS. 8, 9, and 17 that screen 800 provides data entry blocks 802 and 804 for entry of the data elements according to the predetermined data hierarchy. As discussed above, the design tool may automatically populate one or more of the blocks depending on user-specific data received from the user's organization system. Also as discussed above, the screen displays those rules stored in database 130 under the data elements defined by the user in the blocks.

Because each rules editor relates to a given rule type, and therefore defines different functions between different inputs and outputs, in the presently-described embodiment, design tool 132 presents the user with a respective version or view of GUI 616 based on the rule editor/type for which the user will be defining rules. Depending on the rules editor, design tool 132 presents a version of GUI 616 that presents to the user only the options (i.e., selectable functions, including data operations) related to the selected rule type and for which the user will be defining rules. For instance, if there are portions of design tool 132 that are not applicable to the editor, they are removed or hidden from the GUI presented to this user.

Assume, for example, that a user accesses design tool 132, that the design tool's security module identifies the user, the user's system and functional roles, and a plurality of rule editors associated with the user's functional role(s), in database 134, and that the user selects the "decision" rule editor. Design tool 132 then presents an initial user interface screen 800 associated with the design type rule, presented as GUI 616 as shown in FIG. 8.

Screen 800 includes a rule explorer tab 802 and a data tab 804. Rule explorer tab 802 comprises the entire business domains and rule sets, in a tree view format, if any have previously been defined for the user. The user selects tab 802 to initiate creation and/or maintenance of rules. Design tool 132 populates tabs 802 and 804 with information necessary to define rules of a type associated with the editor. Design tool 132 populates data tab 804 using information contained in data dictionaries available to the design tool as described in more detail below. For example, a master data dictionary is created before design tool is initiated at step 210 and is loaded by the design tool into data tab 804 when the design tool is initiated. The master data dictionary, in this example, takes the form of an extensible markup language ("XML") schema that defines the data elements of database 134 that the user may incorporate into a rule. For example, the XML schema identifies the columns within the tables of a database which may be used as input to the rule being defined or which may be identified as the data upon which the rule performs some function.

Design tool 132 causes two types of data dictionaries to be available within data tab 804. The first is the master data dictionary and is depicted on data tab 804 by an icon 806 labeled "DD." This data dictionary contains data items that are imported or manually added at the business domain level. As explained below, the user imports data elements and then selects specific data elements included within the master data dictionary that may be associated with the rule.

The second data dictionary is the business rule domain ("BRD") data dictionary and is identified by an icon 808 labeled "BRD" on data tab 804. The BRD data dictionary is built from, and is therefore a subset of, the master data dictionary. While the master data dictionary contains all data that is available at the business domain level, the BRD data dictionary includes data the administrator believes is applicable to and will subsequently be used by the user to define rules for the business rule domain.

The master data dictionary is all data available for a business domain to be used by any of its business rule domains. Referring additionally to FIG. 9, in order to include the data elements defined by the master data dictionary in data tab 804, the user right clicks anywhere in the data tab. As a result, design tool 132 presents the user with a menu option 900 to create a group. Menu option 900 allows for different data groups to be defined in data tab 804. A group is a logical collection of data that comprises subsets of the data defined by the master data dictionary that the user may include in the definition of a rule. As explained in more detail below, the data groups also identify whether data comes from a schema or is manually added by the user. Adding data manually is accomplished via a different menu option as explained below.

Figure 10:
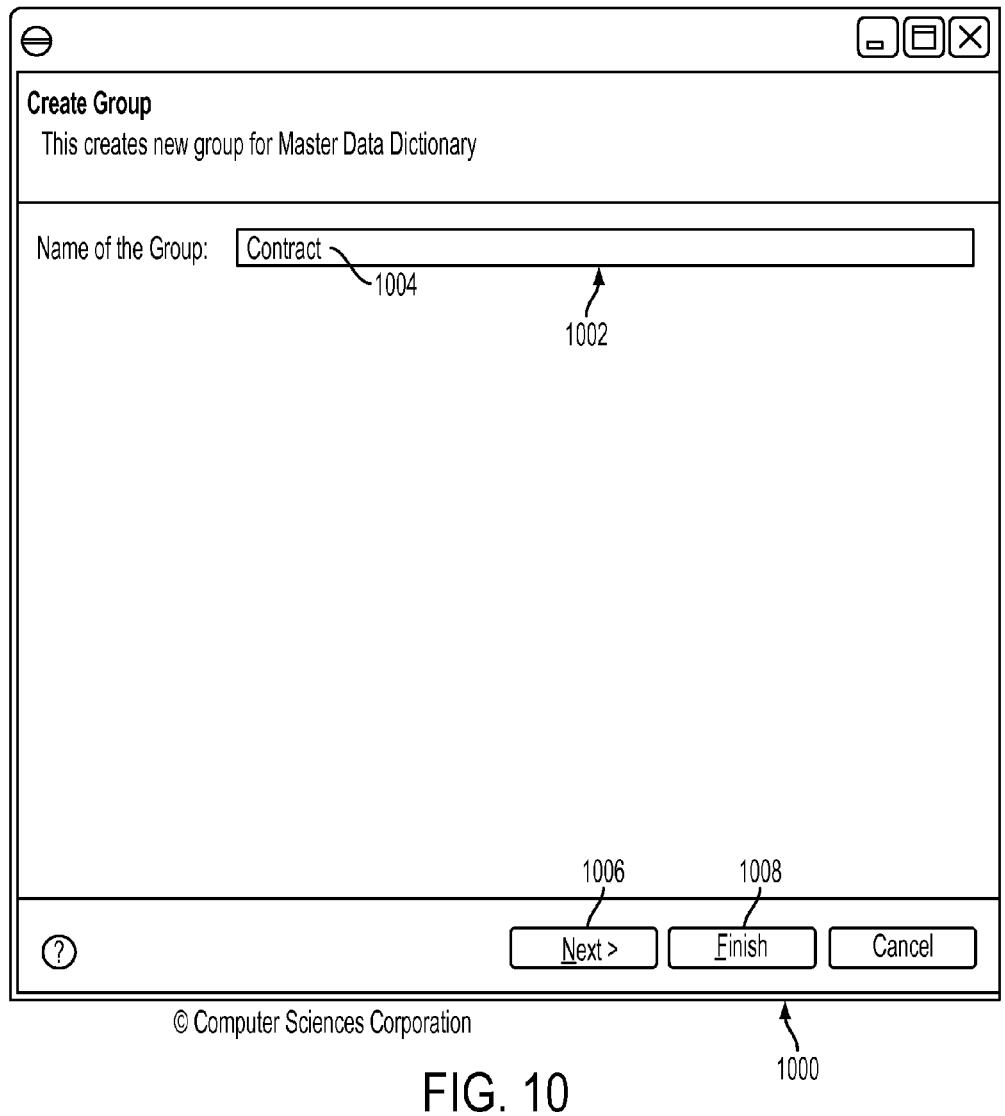
Figure 11:
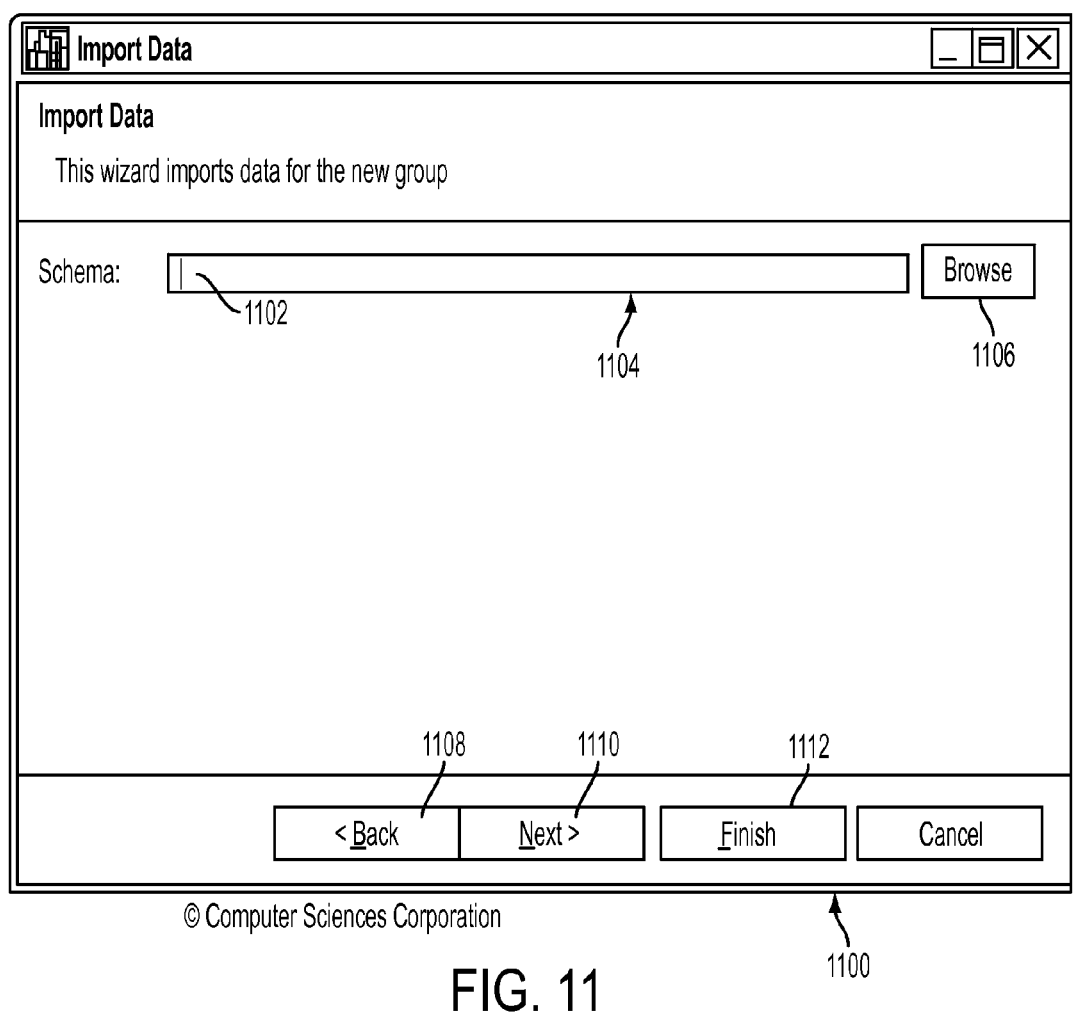

When the user invokes create group menu option 900, design tool 132 presents the user with a create group screen 1000 with an entry field 1002 that will allow the user to provide a name 1004 of the data group being adding, as illustrated in FIG. 10. After the user provides name 1004 via entry field 1002, the user can either activate a next button 1006 or a finish button 1008. Activating next button 1006 navigates the user to an import data screen 1100 (FIG. 11). Alternatively, activating finish button 1008 saves and adds the data group to data tab 804 and closes screen 1000. In order to complete the import process at a later time after selecting finish button 1008, the user right clicks the data group now located in data tab 804 and selects a menu option labeled "Import." As a result, design tool 132 displays import data screen 1100 (FIG. 11).

Referring to FIG. 11, import data screen 1100 allows the user to define a path 1102 for importing data dictionary schema. Path 1102 can either be entered manually into an entry field 1104 or may be facilitated by the operating system, as should be understood, by selecting a browse button 1106 to locate the path.

After the user provides path 1102 to screen 1100 using entry field 1104, the user may invoke one of a back button 1108, a next button 1110, and a finish button 1112. Activating finish button 1112 causes design tool 132 to import the data contained in the schema and make it available in data tab 804. If the user decides to delay in finishing defining the master data dictionary, the user may follow the steps described above in order to complete the import of the master data dictionary.

Activating back button 1108 in screen 1100 or a similar back button in any other screens described herein causes design tool 132 to save in memory any data or other information provided by the user to the respective screen. If the user previously invoked finish button 1112 or a similar finish button on a previous screen, however, design tool 132 does not save any data provided on the current screen, such as screen 1110. In that circumstance, design tool 132 only saves any data provided if finish button 1112 is invoked on screen 1100 or any subsequent screens.

Figure 12:
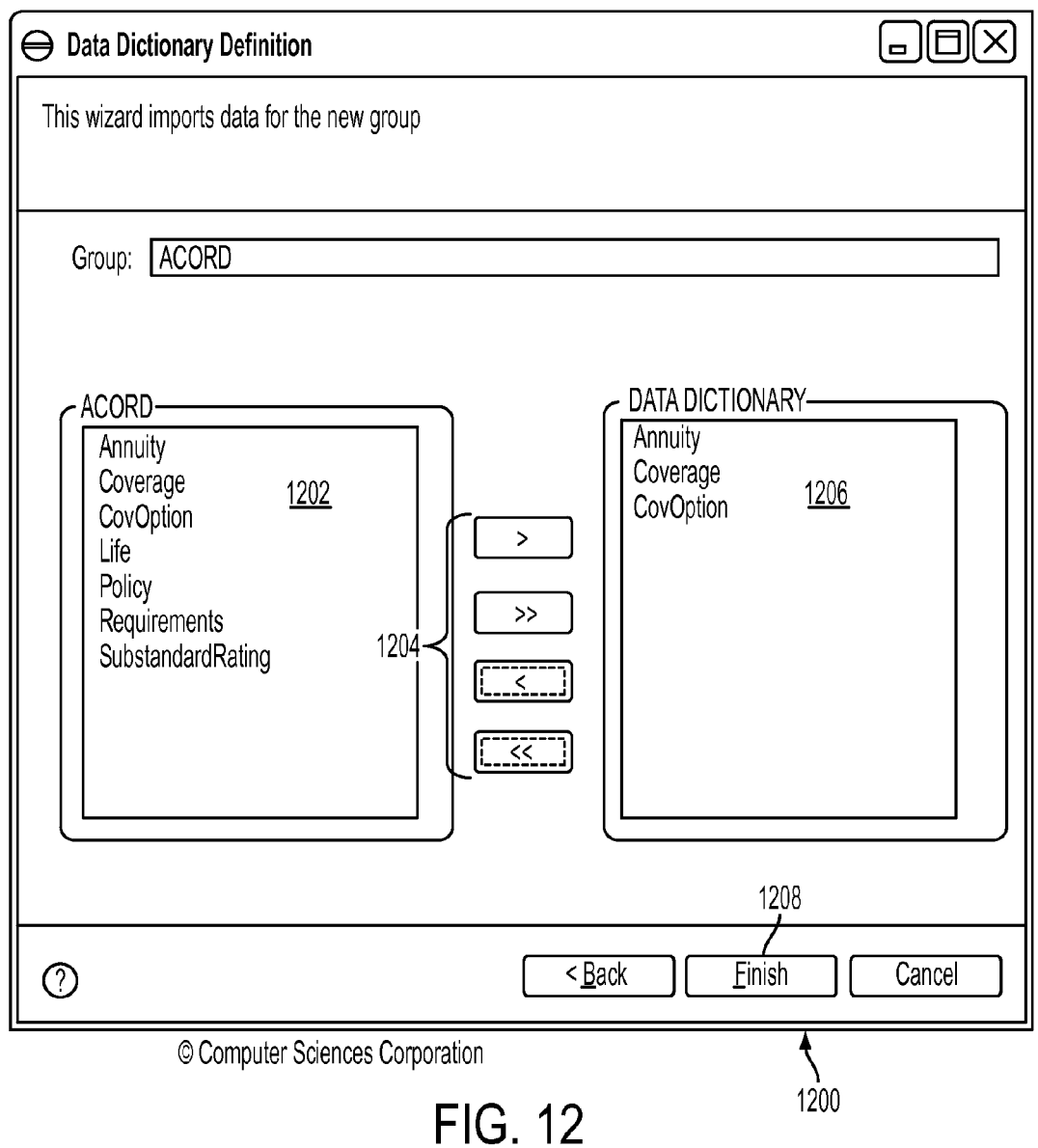

Invoking next button 1110 retrieves an amount of information from memory sufficient to allow the user to select a subset of available data to import into the data dictionary being defined. FIG. 12 illustrates a screen 1200 presented by design tool 132 which displays the available information to the user that has been loaded from the XML database schema. A selection box 1202 and action buttons 1204 allows the user to select all or a subset of the schema data. This eliminates unnecessary data objects from being included into the master data dictionary. Screen 1200 also includes a selected box 1206, which identifies the schema data that the user has selected from the loaded database schema. The items the user selects from selection box 1202 and transfers to selected box 1206 via action buttons 1204 become part of the data dictionary that is defined by the user.

In the current example, the user defines the master data dictionary by selecting the desired data elements from database 134 in the manner described above. In this scenario, attributes of the data elements selected by the user to be included in the master data dictionary are unavailable. The selection of specific attributes, such as XML tags for the data dictionary, is available to the user for selection when the user defines the BRD data dictionary, as explained below.

Figure 13:
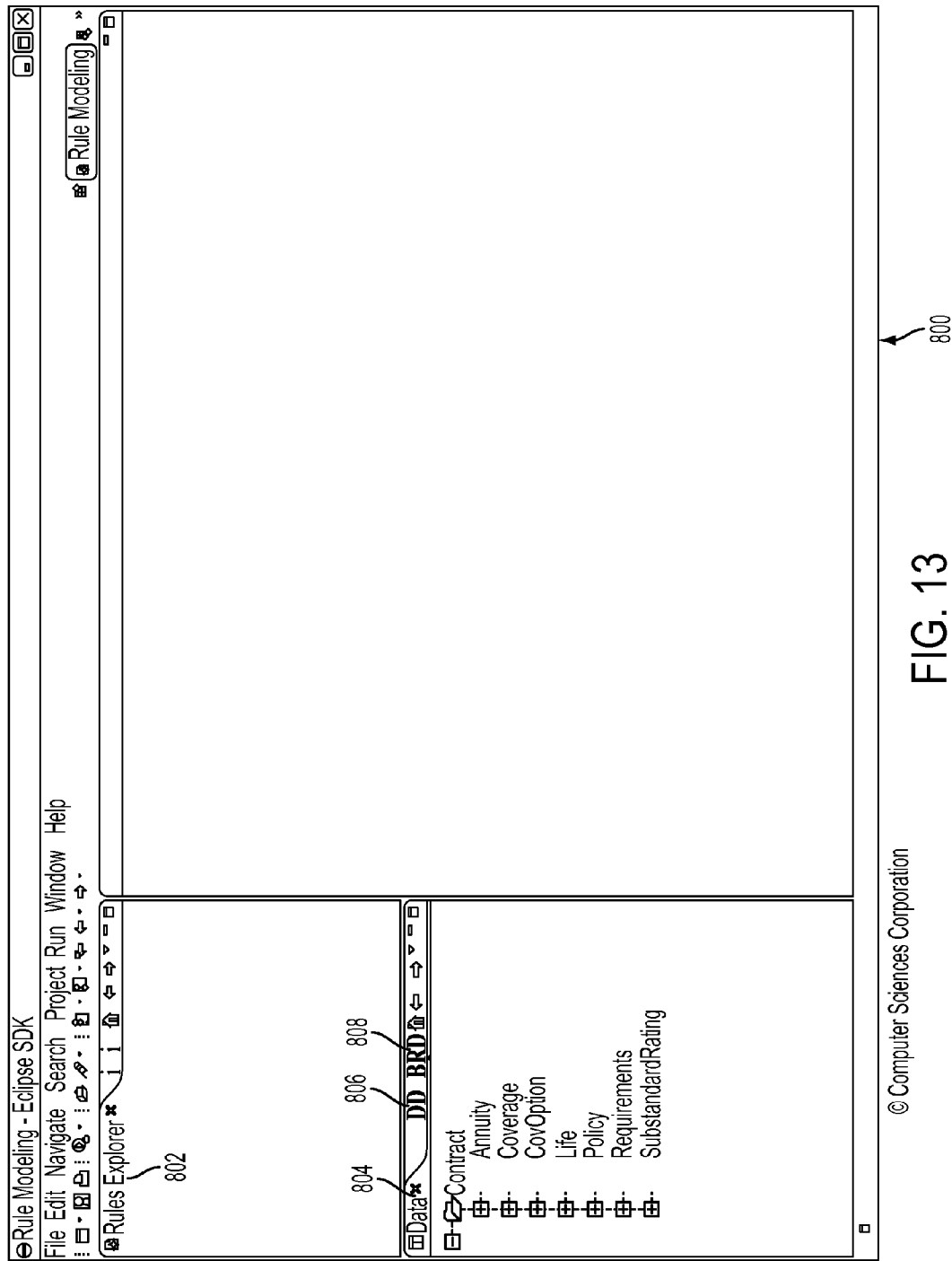

After the user selects the desired data objects to be included in the master data dictionary, the user invokes a finish button 1208. As a result, screen 1200 closes, the selected data objects are incorporated into the master data dictionary, and design tool 132 returns the user to screen 800 as illustrated in FIG. 13. As shown in this illustration, design tool 132 loaded the data objects selected by the user as described above into data tab 804.

It should be understood that the data displayed in data tab 804 is organized as a hierarchical tree structure, such that activating each level by activating the plus symbol expands that level to display the level(s) below. Likewise, rule tab 802 is configured to display a tree structure of the business domains associated with the user. The tree structure is a hierarchical manner to define and compartmentalize the rules created by the users. In the presently-described embodiment, the tree structure comprises at least three levels: business domain, business rule domain, and business rule sub domain, as explained above. It should be understood that the levels are a hierarchical manner to define and compartmentalize the rules created by users and that the hierarchy may include any number of desired levels.

Figure 14:
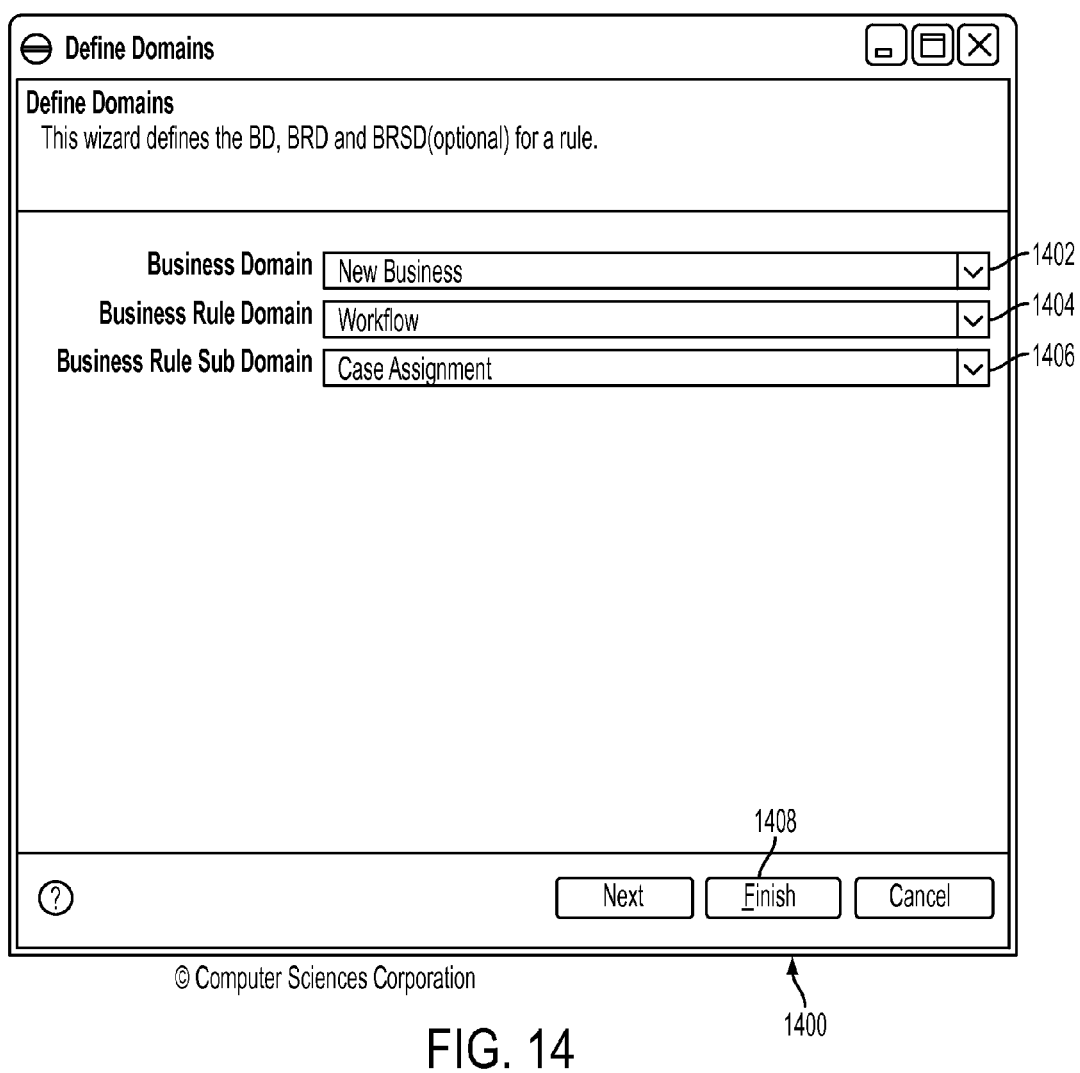

To define a rule, the user right clicks in rule tab 802 and selects a "define rule" menu option that appears as a result. Referring to FIG. 14, design tool 132 presents a screen 1400 to the user after activation of the "define rule" menu option. Screen 1400 presents selection dropdown boxes 1402, 1404, and 1406 that allow the user to select the business domain, the business rule domain, and the business rule sub domain, respectively. Activating a finish button 1408 causes design tool 132 to save the domains selected by the user via selection dropdown boxes 1402, 1404, and 1406.

Design tool 132 requires the user to define the BRD data dictionary prior to defining any rules associated with the selected business rule sub domain. Referring again to FIG. 13, the user selects BRD icon 808 from data tab 804. If the BRD data dictionary has not previously been defined, the user right clicks in data tab 804 and selects a "new/update BRD data dictionary" menu option. As a result, design tool 132 presents a screen 1500 to the user as illustrated in FIG. 15.

Figure 15:
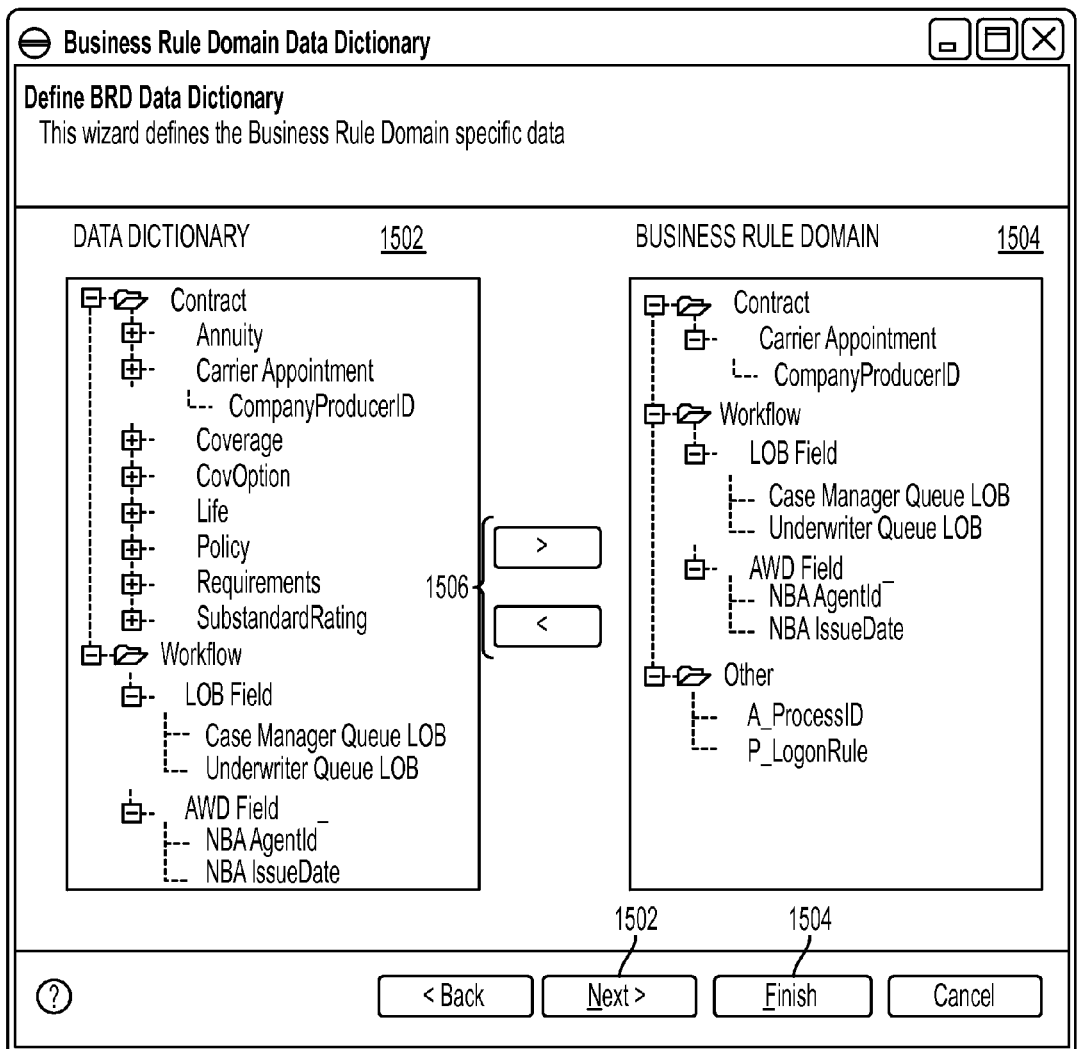

Referring to FIG. 15, screen 1500 allows the user to define the BRD data dictionary. The user then selects data elements from the BRD data dictionary to include in the rules created by the user as input and/or output, as explained in more detail below. When the user established the master data dictionary as explained above, the user was only able to select schema objects and not specific XML elements. When the user defines the BRD data dictionary, however, entire objects do not have to be added and the user may select single data elements.

Screen 1500 comprises two selection tables: master data dictionary selection table 1502 and BRD data dictionary selection table 1504. Screen 1500 also comprises action buttons 1506 configured to allow the user to select elements from the master data dictionary to be included into the BRD data dictionary, as should be understood.

Figure 16:
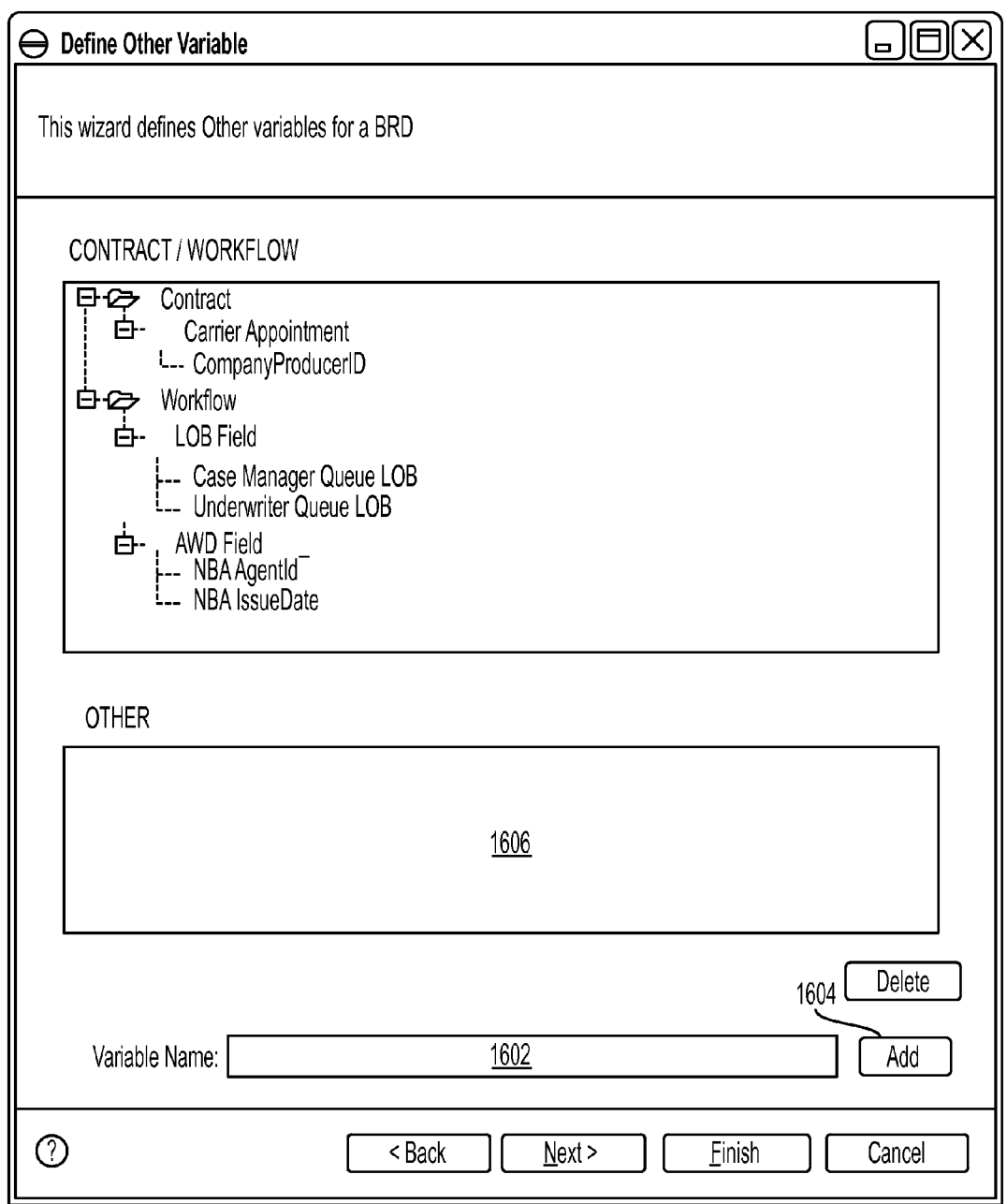

Should the user desire to also include variables in the rule to be defined that are not in the data dictionaries, the user selects a next button 1502 and is presented with a screen 1600 (FIG. 16). Otherwise, when the user is finished selecting the data elements from the master data dictionary to be included in the BRD data dictionary, the user invokes a finish button 1502.

Referring to FIG. 16, if the user desires to define additional variables, design tool 132 presents screen 1600. The user enters the name of a desired variable in an entry field 1602 and invokes an add button 1604. As a result, design tool 132 adds the variable to a variable selection area 1606 and clears entry field 1602. The user is thus able to define as many additional variables for the rule as desired. Invoking a finish button 1606 returns the user to screen 800 (FIG. 17). The BRD data dictionary includes an "other" area that comprises any and all variables defined by the user via screen 1600.

Referring back to FIG. 2, once the user has defined the BRD data dictionary, the user defines the input for the rule using the BRD data dictionary at step 220. Although the user may select the output for the rule from the BRD data dictionary, as well, it may also be manually defined. FIG. 17 illustrates screen 800 where design tool 132 has loaded the BRD data dictionary into data tab 804. Data area 1700 of screen 800 comprises two horizontal tabs 1702 and 1704 (triggered by button 808) within a data area 1700 identified with an input label 1706 and an output label 1708, respectively. The data elements located in data tab 1702 are the inputs for the rule created by the user. In order to add data elements to input tab 1702, the user selects and drags a data element from the BRD data dictionary in data tab 804 to an input area 1710 associated with input tab 1702. In this embodiment, the layout of the input information contained in the input area 1710 mimics the layout of the corresponding data elements as arranged in the BRD data dictionary tree view in data tab 804. For instance, when the user places a specific data element in input area 1710, the hierarchical arrangement of the data element shown in the BRD data dictionary of data tab 804 is carried over with the data element to the input area.

When output tab 1708 is selected, input area 1710 is replaced by an output area. Output data for the rule can come from the BRD data dictionary or may be manually created by the user. The steps performed when adding data items from the BRD data dictionary to the output area are the same as explained above for defining the input data. The user can also define custom output for the rule by selecting anywhere in the output area, right clicking, and selecting a menu entitled "define output" that appears as a result. Selecting the "define output" menu option causes design tool 132 to present a screen to the user that allows the user to define an output similar to screen 1600 (FIG. 16). The screen includes "Cancel" and "OK" pushbuttons at the bottom of the screen. At the top of the screen is a table for displaying the output items associated with the rule, which is initially empty when the view is opened. There is a "Delete" pushbutton below the table and associated therewith in order to remove any unwanted output items appearing in the table. At the bottom of the screen is an "Output" entry field that allows the user to enter the output data item to be added to the rule. The "Add" pushbutton to the right of the entry field allows the user to add the data item in the entry field to the output table. The user is able to add the necessary output data items by repeating the above process for each output data item. When the user has added the desired output data items, the user invokes the "OK" pushbutton. As a result, the design tool 132 closes the screen and adds the output data items defined using the screen to the output area associated with output tab 1704. Double clicking on any data item within the output field of screen 800 initiates a data item editor that allows the user to define the data type for each manually defined output item.

For purposes of the following explanation, "functions" are common routines that may be included in a rule to perform an action. While it should be understood that there are multiple functions that may be incorporated into a rule, the ensuing explanation describes adding a single function to a rule, where the function is a conditional statement. It should be understood that adding other functions to a rule is performed in a manner similar to that described below. Thus, it should be understood that the process described above allows a user to define the input and output data for a rule. The following description explains how to create a rule by incorporating functions into the rule at step 230 (FIG. 2).

In order to add a function to a rule, the user right clicks on any level of a hierarchy 1712 of the rule in a rule area 1714. As a result, design tool 132 causes a "New" menu option to appear. If the user selects the "New" menu option, design tool 132 causes a tear off menu (i.e., a secondary menu) to appear presenting the user with the option to create a conditional statement. It should be understood that the tear off menu may be configured to present additional options to the user corresponding to each additional function that may be included in the rule.

Figure 18:
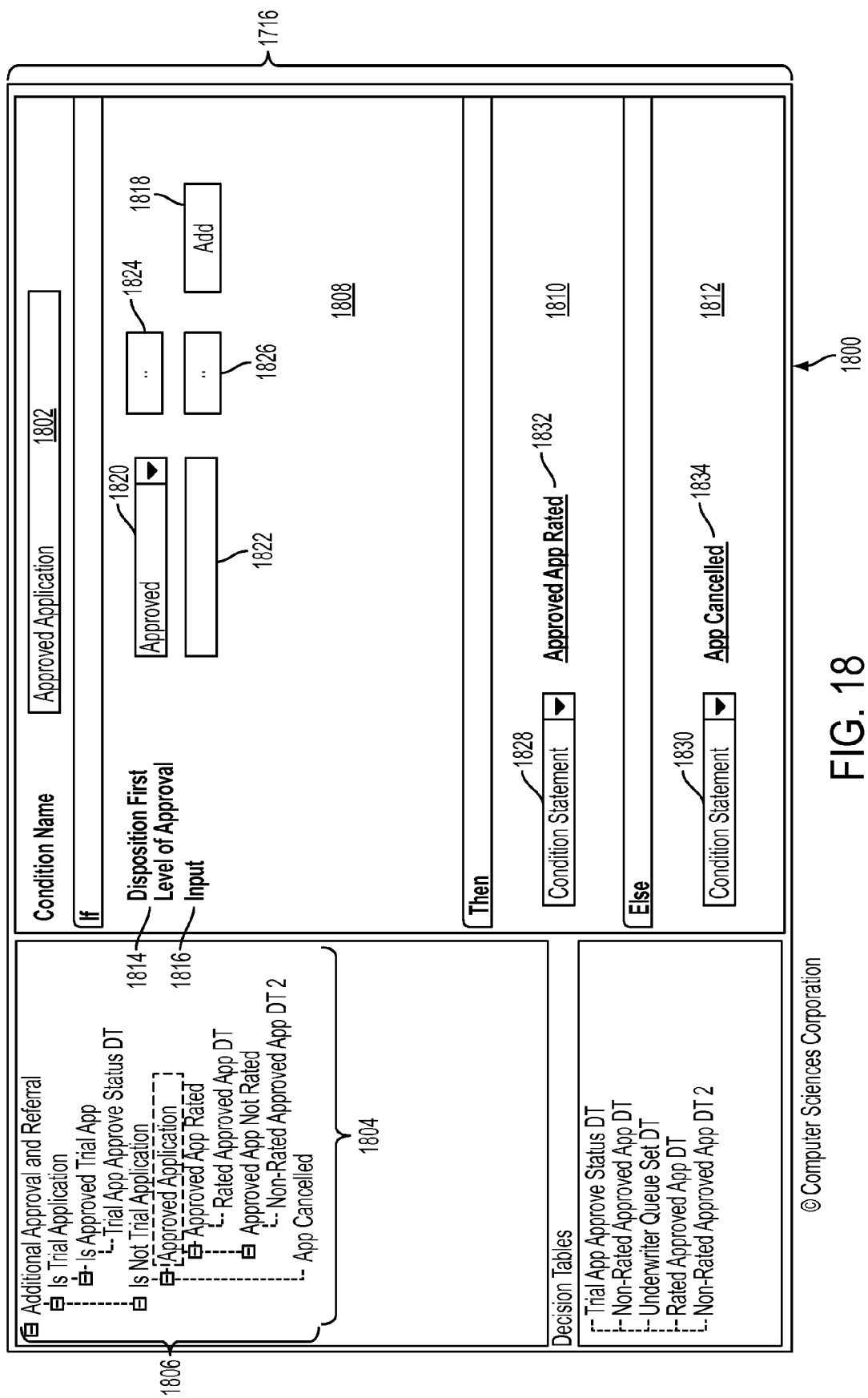

Activating the menu corresponding to the conditional statement causes design tool 132 to present a condition editor in a rules definition area 1716. FIG. 18 illustrates a condition editor 1800 presented by design tool 132 within rule definition area 1716 (FIG. 17). Condition editor 1800 comprises a first field 1802 where the user may provide a name for the conditional statement. The name provided to first field 1802 is listed in a rule wizard area 1804 with all the other pieces of a rule 1806. Rule definition area 1716 is segmented into three section to represent an if 1808, a then 1810, and an else 1812 construct. Although the rule may use both then 1810 and else 1812 areas, it should be understood that the rule may be configured to only use then 1810 area. In those situations the user opts not to populate else area 1812.

Design tool 132 provides the user with the ability to select any necessary items for the conditional statement within if area 1808, including attributes, expressions, and input. Design tool 132 initially presents GUI to the user with two sets of 'if' fields 1814 and 1816. If the user requires additional input fields, the user may invoke an add button 1818. If so, design tool 132 adds another set of input fields below the last set 1816. Design tool 132 also provides the ability to define multiple data items as an 'and' and/or 'or' situation by activating ellipse buttons 1824 and 1826 and selecting the desired modifier.

The user defines the if portion of the conditional statement using first input field 1814. The user adds data items to the input fields by dragging and dropping them into the input fields from input area 1710 (FIG. 17). Design tool 132 dynamically changes a second field 1820 from an entry field to a dropdown selection box if the data item dragged and dropped over first field 1814 is associated with predefined values. In this example, for instance, the "disposition first level of approval" data element is associated with at least a value of "approved," thereby causing second field 1820 to change to a dropdown selection box with the values associated with the data element. Otherwise, second field 1820 provides the user with the ability to manually enter a value or an expression in the second field as illustrated by a third field 1822. Expressions may be used in situations where the user desires the output of the rule to be generated when values of data elements or variables are 'greater than,' 'less than,' etc. (i.e., ">75,000" is an expression). The user may begin to provide the expression via fields 1820 and 1822. As a result, design tool 132 presents a dropdown list with content assist to help guide the user in adding the expression. Once the expression needed has been located in the list, the user can simply select the expression or continue typing. Selecting the desired expression inserts the expression in syntax form into the selected entry field. An example of one of the content assist items in the dropdown selection box might be ">= Is greater than or equal to X." If the content assist item in this example is selected, ">=X" is inserted into the second field. Selecting an expression involving a range, such as "is greater than X but less than Y," causes the second field to be updated with "X . . . Y" where both X and Y are editable.

Each of then section 1810 and else section 1812 includes respective dropdown boxes 1828 and 1830. Dropdown boxes 1828 and 1830 include any functions available to the user to add to the rule. In this example, the functions selected via dropdown boxes 1828 and 1830 would be executed depending on the outcome of the condition defined in if section 1808. It should be understood that the functions available for selection using dropdown selection boxes 1828 and 1830 have been previously defined. Based on the selection of dropdown selection boxes 1828 and 1830, design tool 132 dynamically changes fields 1832 and 1834, respectively. If the user selects "Expression" from either dropdown selection boxes 1828 or 1830, design tool 132 causes two additional input fields to appear. The user drags an output item from the output area described above with respect to FIG. 17 to the first field. The user enters an appropriate value for the output in the second field.

When the user completes the process of defining the condition statement, the user invokes an "Update" pushbutton, which causes design tool 132 to insert the condition statement, in memory, at the bottom of the node of tree 1806 originally selected within rule wizard portion 1804.

In the present example, the user has selected then portion 1828 and else portion 1830 to each be another condition statement, thereby creating a nested condition statement. Selecting "condition statement" from dropdown selection box 1828, for example, causes design tool 132 to present a second condition editor, similar to condition editor 1800. The user defines a second condition statement in a manner similar to that described above. This may include defining additional nested condition statements from the second condition statement editor. When the user saves and closes the second condition editor, design tool 132 saves the second condition statement to memory, places its name at the appropriate location in tree 1806, and adds a hyperlink 1832 adjacent to dropdown selection box 1828 that includes the name of the second condition statement.

At step 250, design tool 132 stores the rule created by the user via the design tool as metadata and, in one embodiment, as XML metadata. For example, design tool 132 stores the exemplary rule defined by the user via the design tool as described above and illustrated as the XML metadata shown in FIGS. 19A, 19B, and 19C. An example of such an XML metadata file for another exemplary rule defined by a user via design tool 132 is attached hereto as Appendix A.

At step 250, design tool 132 translates the rule as stored in metadata into a syntax corresponding to the predetermined rules engine associated with the rule. That is, design tool 132 translates the metadata into a rules engine syntax understood by the interface associated with the predefined rules engine so that the translated rule is executable by the rules engine. In one embodiment, this is accomplished using an XML mapper/translation engine as explained in more detail below with respect to FIG. 5. The translation engine may utilize a mapper definition set or "metamodel" in order to translate the rule as stored by the design tool in metadata. An example of such a metamodel for use in translating rules to be used with the VP/MS rules engine is attached hereto at Appendix B. Appendix C sets forth an exemplary translated rule created when the exemplary rule defined in the XML metadata file attached as Appendix A is translated by the translation engine according to the metamodel attached as Appendix B. At step 260, design tool 132 stores the translated rule in shared rules repository 128.

Selection of a rules engine to associate with the rule occurs prior to translation, at step 240. In one embodiment, the rule is associated with a rules engine based on the type of the rule the user is permitted to define as described above. In another embodiment, this occurs when a user identifies an environment with which to associate the rule. A user with appropriate permissions may be presented with a "display" option in a graphical user interface screen to select an environment. Activation of this option presents the user with a list of predefined environments, which represent functions associated within the organization and that the organization defines at construction or thereafter through an administrative process. It should be understood that the environment may alternatively be identified by design tool 132 upon the tool's initiation by an application from within a specific environment and then stored by the tool for use during translation of the rule as described below. In one embodiment, the organization associates each of these environments or functions with a type of rule. Each rule type is associated with a rules engine in database 134, such as rules engine 116, 118, or 120. Thus, when the user selects a rule in the user interface, and an environment has been identified (either by the user or automatically by the design tool, depending on the embodiment), at step 240, a translation engine (a computer program comprising part of system 100) translates the rules into the syntax for the identified rules engine at step 250, as described below with respect to FIG. 5.

The translation engine stores the translated rule and the identification of the rules engine selected at step 240 to execute the translated rule in the XML metadata. For instance, if the translation engine identified rules engine 116 as the rules engines tasked with executing the rule, the translation engine stores an identification of rules engine 116 in the metadata. The design tool also stores in the metadata the identifier for the rule that applications will use to request that the rules execution platform execute the rule.

The above described steps may be performed in various orders, and need not necessarily occur together. For example, a user may define a rule, which may be stored for later association with a rules engine and translation into the format compatible with the associated rules engine.

Figure 3:
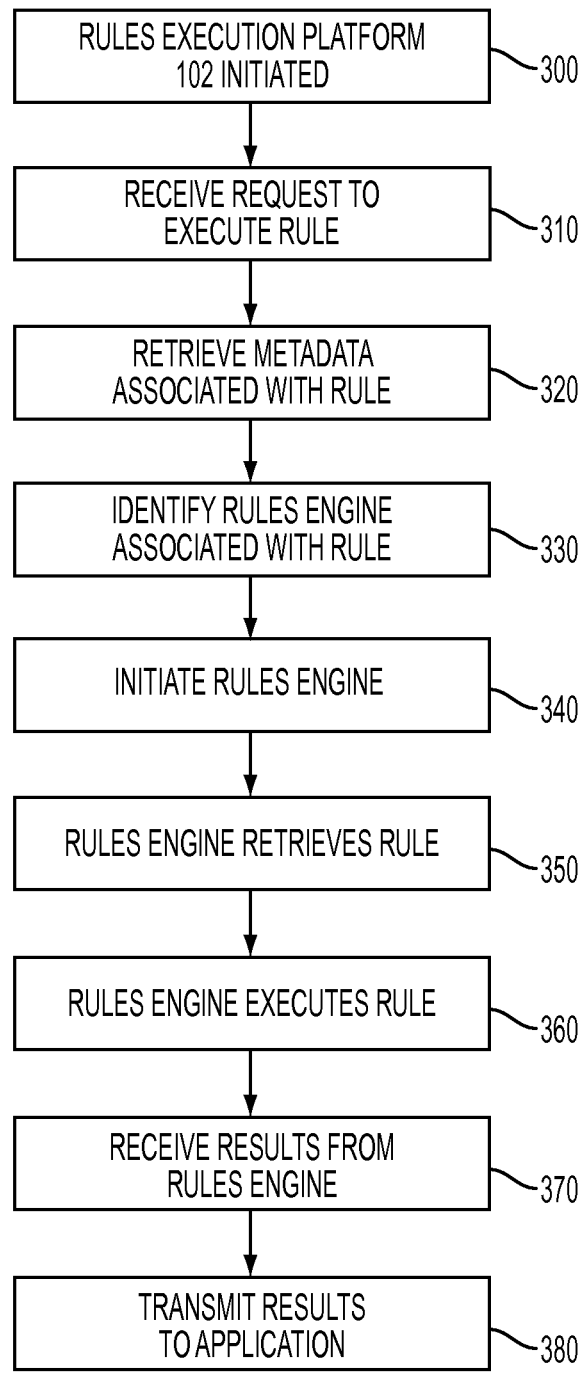
FIG. 3 is a flowchart depicting an exemplary technique for executing one or more rules in accordance with an embodiment of the present invention.

FIG. 3 is a flowchart illustrating an exemplary manner of processing a request to execute a rule received by rules execution platform 102 (FIG. 1) from an application, such as applications 104, 106, and 108. The ensuing explanation of the process illustrated in FIG. 3 is made with reference to the components of system 100 illustrated in FIG. 1. At step 300, system 100 initiates rules execution platform 102, which in a preferred embodiment is accomplished automatically when the computing device upon which rules execution platform 102 is installed initiates, as should be understood by those skilled in the art. At step 310, an application, such as application 104, 106, or 108, sends a request to execute a rule to rules execution platform 102. The rule is one defined by a user via design tool 132 in the manner described above with respect to FIG. 2. The request to execute the rule includes an identification of the rule along with any input or an identification of the input required by the rule. In one embodiment, the identification of the rule comprises the name of the rule, while, in another embodiment, it comprises an id associated with the rule that design tool 132 stores in the metadata for the rule when the user creates the rule. For example, design tool 132 may assign sequential numbers to rules as id's as the rules are created. It should be understood, however, that the mechanism to correlate a rule to a rules engine in the metadata can vary and is not in and of itself critical to the presently-described embodiments, and the particular mechanisms described herein are provided for purposes of example only.

Based on the identifier, rules execution platform 102 retrieves the metadata associated with the stored translated rule at step 320 and identifies the rules engine associated with the rule at step 330. At step 340, rules execution platform 102 transmits the translated rule to the rules engine identified at step 330. Rules execution platform 102 also transmits any inputs for the translated rule that were received from the application at step 310 to the rules engine identified at step 330. For example, if rules execution platform 102 determines that rules engine 118 is associated with the rule, then the rules execution platform transmits the rule and any inputs to rules engine 118 via interface 124.

At step 360, the rules engine receiving the translated rule executes the rule. The rules engine uses any inputs that rules execution platform 102 transmitted to the rules engine in order to execute the rule. Likewise, the rules engine uses any data elements of database 134 as called for by the translated rule. For instance, the translated rule may identify data elements of database 134 as additional inputs to the rule or to be altered as outputs of the rule. It should be understood that the identification of the data elements are stored in the rule's metadata by design tool 132 when the rule is created and in the translated rule's metadata when the rule is translated. The rules engine retrieves any necessary data from database 134 identified by the rule's metadata as necessary for its execution of the rule.

It should be understood that when the rules engine executes the rule, the engine may generate one or more outputs. As explained above with respect to step 230 (FIG. 2), the user may define any output for the rule using design tool 132. At step 370, the rules engine transmits any output generated by its execution of the rule to rules execution platform 102. Rules execution platform 102 may format any output into a format requested by the application that requested the rule be executed. At step 380, rules execution platform 102 transmits the output to the application that requested execution of the rule.

As explained above with respect to step 240 (FIG. 2), the translation engine associates a rule defined by a user with a rules engine based on the environment selected by the user or identified by design tool 132 during the process of defining the rule.

In another embodiment, the translation engine associates the rule with a rules engine based on the type of the rule. It should be appreciated, however, that other factors may be used to determine which rules engine is associated with a rule defined by a user. Referring to FIG. 4, for example, one or more of exemplary rule characteristics 400 may be used in order to determine such an association.

Rule characteristics 400, which may be stored in database 130 or 134, may include user profile 410, a rule type 420, input data 430, rule output data 440, user input 450, rule syntax 460, rule semantics 470, or a description 480 of a rule. In addition to the user id described above, user profile 410 may include, for example, an occupation of the user, or information that allows the occupation of the user to be derived, among other possibilities. For example, the translation engine or design tool 132 may associate a rules engine with any rules that are defined by an individual user having a particular occupation or who has access to particular areas of an application, such as billing or document management. A table in database 134 may relate the user occupation or access rights to predetermined rules engines. Design tool 132 may be configured to identify the user's occupation from user profile 410 in response to the user's id determined as described above, and thereby associate the particular rules engine with any rule defined by that user. User profile 410 may also identify the rules defined by the user in the past or include information from which the rules can be identified. In such an embodiment, design tool 132 identifies the rules engine associated to the rules previously created by the user and assigns the same engine to any additional rules defined by the user.

The rule may be explicitly associated with a particular rules engine based on user input 450. For example, a user may specify that a rule is to be executed by a particular rules engine. In one embodiment, for example, design tool 132 presents a list of available rules engines to the user. The user selects the rules engine from the list that the user wants to execute the rule. Design tool 132 stores the identification of the rules engine selected by the user in the metadata for the rule at step 250 (FIG. 2) once the rule has been created.

In another embodiment, once the rule has been created, design tool 132 analyzes the syntax 460 and semantics 470 of the rule to determine which rules engine should be associated with the rule. For instance, there may be syntactical elements of the rule that make it more or less likely that the rule should be associated with a particular rules engine rather than another. For example, the use of particular operators or comparisons may suggest a particular rules engine should handle the rule. Semantics 470 of the rule may also be leveraged in such a manner.

In another embodiment, design tool 132 is configured to allow the user to provide descriptive information about the rule. Design tool 132 stores the descriptive information with the rule in the metadata associated with the rule. The description may indicate how the rule achieves a result or provides more information about the field of endeavor to which the rule applies. Thus, description 480 may describe a domain, purview, or intended purpose for which the new rule will be used. For instance, the user may include a particular domain, such as contract work, new business, or product configuration descriptions, in the description of the rule. A user may also specify, for example, that a particular rule is useful for case management 481, correspondence 482, distribution 483, compensation 484, illustrations 485, underwriting 486, product management 487, or adjudication 488, which may be business rule domains. Those skilled in the art should understand that the above descriptions are exemplary, and other possible descriptions may be used depending on the particular rules engines, applications, and rules involved. Design tool 132 may also associate a particular rules engine for a rule based on the intended purpose of the rule.

Figure 5:
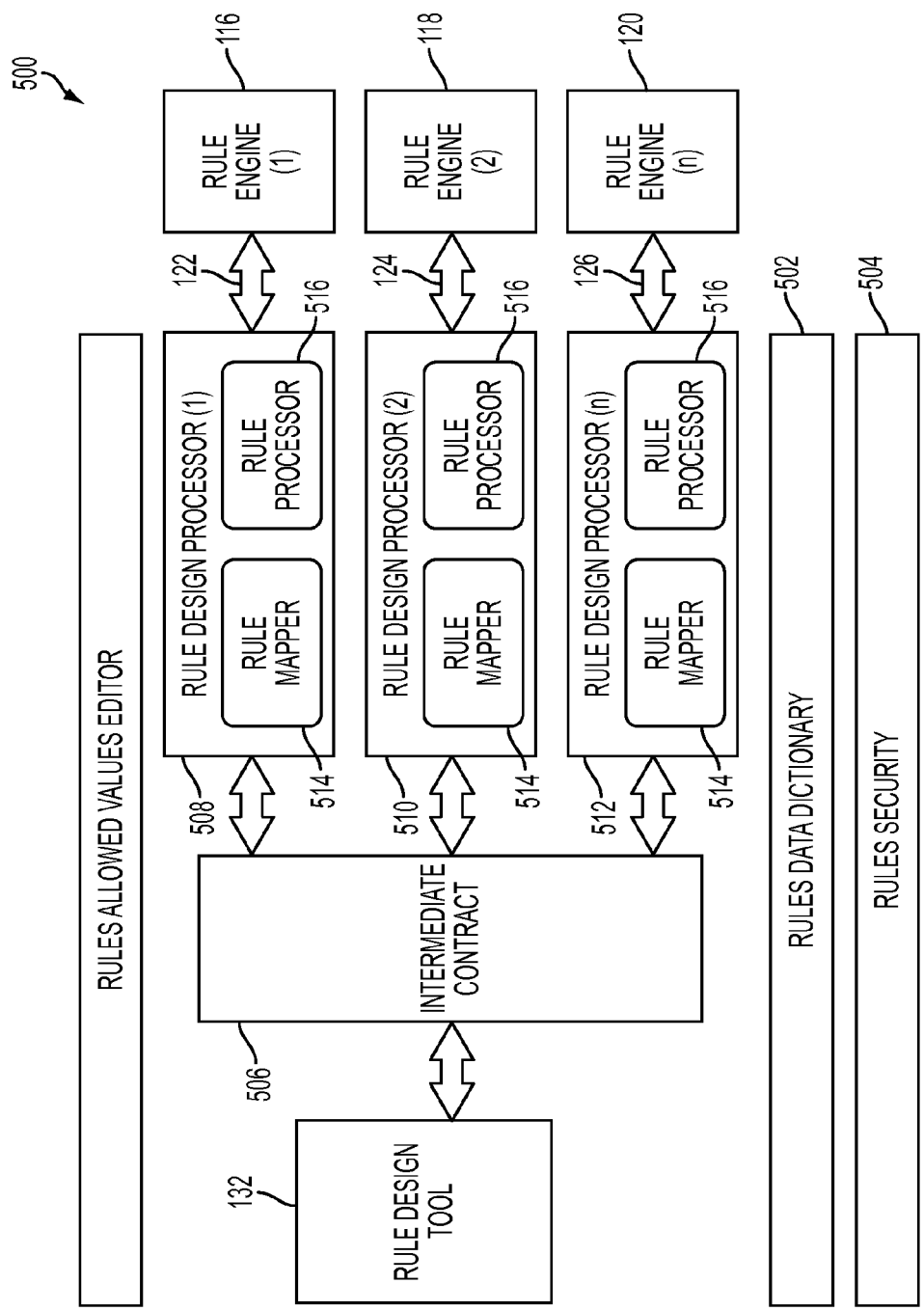
FIG. 5 is a flow diagram depicting an exemplary technique for translating a rule from a platform syntax into a rules engine-specific syntax in accordance with an embodiment of the present invention.

As explained above with reference to FIG. 1, once a rule is associated with a particular rules engine, the rule is translated into a format compatible with the associated rules engine. FIG. 5 depicts an exemplary process flow 500 for translating a rule defined according to a platform syntax into a syntax understood by the identified rules engine.

As explained above, design tool 132 provides a user with the ability to define and create rules according to a platform syntax. The platform syntax includes the inputs, outputs, and functions that generate outputs from inputs, along with relationships among these elements presented by design tool 132 to the user for selection. The data dictionary provides design tool 132 with data elements available to the user to include in the rule. That is, as explained above, the data dictionary identifies data elements of database 134 that the user may include as inputs to, as outputs of, or to be used by the rule.

Referring to FIGS. 1 and 5, a rules security layer 504 determines which portions of rules data dictionary 502 are available to a user creating a rule of a given type. That is, based on the selected rule type, or rules editor, the design tool may limit the user, in the process of creating rules, to certain predetermined portions of rules data dictionary 502. Rules data dictionary 502 was previously established in the manner described above with respect to step 220 (FIG. 2).

Once the user has defined a rule according to the platform syntax, the result is the metadata for the rule described above with respect to step 250 (FIG. 2) referred to as an intermediate contract 506. Intermediate contract 506 comprises all the pieces of the rule defined by the user, including the functions, input data, and output data, using design tool 132. As explained above, the rules engine that will execute the rule is selected based upon the environment in which the rule will be used. Process flow 500 utilizes rule design processors 508, 510, and 512 for each respective rules engine 116, 118, and 120 used by system 100.

FIG. 5 illustrates three rule design processors because system 100 is configured to use three rules engines: 116, 118, and 120. It should be understood, however, that because system 100 may be configured to use any number of rules engines, process flow 500 may be configured to utilize any number of rule design processors corresponding to the rules engines used by the system. It should be understood that process flow 500 may utilize a single rule design processor for multiple rules engines that adhere to the same interface standard. For instance, if rules engines 118 and 120 adhere to the JSR-94 Specification referred to above, rule design processors 510 and 512 may be combined into a single rule design processor. The processor is configured to output a translated rule that may be understood by either rules engine 118 or 120 because the engines adhere to the same standard.

Each rules design processor 508, 510, and 512 comprises a rule mapper 514 and a rule processor 516. Rule mapper 514 is configured to provide rule processor 516 with the ability to translate intermediate contract 506 from the platform syntax into the syntax understood by the rules engine selected to execute the rule. Rule processor 516 analyzes intermediate contract 506 in order to determine which rule mapper 514 to load. Preferably the platform syntax, as defined by the rule editors, can be used to create only a limited number of rule formats. Thus, given knowledge of the target rules engine syntax, it is possible to determine the ability to translate a rule created in the platform syntax to the rules engine syntax using one-to-one or otherwise relatively straightforward piecemeal translations. It is therefore possible to predetermine those platform syntax formats that can be translated in such a piecemeal fashion. Accordingly, rule processor 516 is constructed to analyze each incoming rule intermediate contract 506, determine its format among the predetermined formats (for example, by analyzing the format itself and/or metadata previously stored in association with the platform syntax rule), and determine whether the intermediate contract is a straightforward piecemeal translation. If so, the translation engine/ rule processor 516 executes the rule mapper 514 to translate the intermediate contract. Rule mapper 514, in this example, is a metamodel that defines a correlation between the inputs, outputs, and functions of the platform syntax to the rules engine syntax understood by the associated rules engine. That is, rule mapper 514 includes a translation for some or all of the inputs, outputs, and functions selected by the user through design tool 132.

Some of the predetermined formats, however, may not translate directly into the target rules engine format, for example because of variability in the platform syntax format or because of a lack of corresponding functions in the target rules engine syntax. It may be possible, however, to define predetermined template rule formats in the rules engine syntax to correspond with the predetermined platform syntax format. Thus, if rule processor 516 determines that intermediate contract 506 is of a format that corresponds to an existing template corresponding to the target rules engine, rule mapper 514 pulls predetermined data from intermediate contract 506, inserts the data into predetermined slots in the corresponding template, and thereby defines the translated rule.

Still further, however, certain of the predetermined platform syntax formats may be too complicated to translate with a metamodel mapper or with a template, for example because the rules engine syntax rule format is not sufficiently predictable to define a template. However, the format of the input rule is predictable, and the syntax of the target rules engine is known. Accordingly, rule mapper 514 is programmed, for example by one or more Java applets, to process the input rule and create a corresponding rule for the rules engine.

Thus, rule processor 516 takes intermediate contract 506 in the form of the platform metadata of the rule as an input and maps the intermediate contract to a rule format understood by the interface of the rules engine selected to execute the rule. Rule processor 516 translates intermediate contract 506 based on a metamodel, templates, and/or Java applets provided by rule mapper 514. Depending on the target rules engine, the rule mapper 514 may need one or more, but not necessarily all, of these three mechanisms. In the presently-described embodiment, rule processor 516 is the same translation engine for each of rule design processors 508, 510, and 512. It should be understood, however, that different rule processors may be employed depending on the rules engine included in system 100. The configuration of the rule design processors vary, however, depending on the specific rule mapper 514 loaded by rule processor 516 of the respective rule design processor, as described above. An example of a suitable rule design processor 508 is the Eclipse Integrated Development Environment ("IDE") maintained by the Eclipse Foundation of Ottawa, Canada.

Process flow 500 stores an association or link of the now-translated rule, the translated rule, and the metadata identification of the rules engine tasked with executing the translated rule in shared rules repository 128. That is, process flow 500 stores an identifier unique to the metadata for the translated rule. The unique identifier can be the rule's name or a sequentially created id as described above.

Information regarding a rules engine syntax may be provided by the vendor of the rules engine, such as in documentation directed to an API distributed with the rules engine, or in a standard to which the interface associated with the rules engine adheres. For example, a vendor of rules engine 116 may provide an API as interface 122 associated with the rules interface. The vendor may also provide documentation, which may be included in the API, that defines the syntax understood by rules engine 116 via interface 122. Thus, design tool 132 may be configured to translate any rule defined by a user into the syntax understood by interface 122 as set forth in the material associated with rules engine 116.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described above, the order of the acts may be modified in other implementations consistent with the principles of the invention. Further, non-dependent acts may be performed in parallel.

The names assigned to variables, tables, and other data structures herein are exemplary only, and are not meant to restrict the invention to particular implementations. Any name may be applied to the data structures used herein, and the names assigned to the data structures should not be interpreted to limit the type, characteristics, or structure of the data structure in any way.

In addition, implementations consistent with principles of the invention can be implemented using devices and configurations other than those illustrated in the Figures and described in the Specification without departing from the spirit of the invention. Devices and/or components may be added and/or removed from the implementations of the figures depending on specific deployments and/or applications. Also, disclosed implementations may not be limited to any specific combination of hardware.

Furthermore, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof. The scope of the invention is defined by the claims and their equivalents.

What is claimed is:

1. A computer-implemented method for facilitating communication between one or more applications and one or more rules engines, the method comprising:
  a. providing a platform protocol including a platform syntax for defining a rule, the platform protocol comprising an association between predetermined criteria relating to the rule and predetermined one or more rules engines;
  b. defining one or more rules according to the platform syntax, wherein each rule of the one or more rules is associated with metadata;
  c. associating a rule defined at step (b) with a rules engine of the predetermined one or more rules engines based on application of the predetermined criteria associated to the rule defined at step (b), wherein the association of the rule defined at step (b) with the rules engine of the predetermined one or more rules engines is stored in the metadata associated with the rule defined at step (b);

d. translating the rule associated in step (c) into a rules engine syntax for the rules engine of the predetermined one or more rules engines; and e. storing the translated rule and its associated metadata in a rules repository.

2. The computer-implemented method of claim 1 further comprising providing the platform syntax via a design tool for defining the one or more rules.

3. The computer-implemented method of claim 2 wherein a view of the design tool varies depending on the predetermined criteria.

4. The computer-implemented method of claim 1 wherein the predetermined criteria for the rule defined at step (b) comprises an environment in which the rule defined at step (b) was defined.

5. The computer-implemented method of claim 1 wherein the predetermined criteria for the rule defined at step (b) comprises an environment in which the rule defined at step (b) is to be executed.

6. The computer-implemented method of claim 1 wherein the predetermined criteria comprises an identification of one of the one or more applications.

7. The computer-implemented method of claim 1 wherein the predetermined criteria for the rule defined at step (b) comprises an identification of a user that defines the rule defined at step (b).

8. The computer-implemented method of claim 1 further comprising:
identifying a user that defines the rule defined at step (b); and
identifying a role associated with the user, wherein the predetermined criteria comprises the role.

9. The computer-implemented method of claim 1 further comprising:
receiving a request from one of the applications to execute a first rule;
retrieving metadata associated with the first rule;
retrieving the translated rule for the first rule;
identifying the rules engine associated at step (d) with the first rule by the retrieved metadata associated with the first rule; and
transmitting the translated rule to the rules engine associated with the first rule.

10. The computer-implemented method of claim 9 further comprising receiving a result from the rules engine associated with the first rule and transmitting the result to the one application.

11. The computer-implemented method of claim 1 further comprising:
providing a data dictionary from which one or more data elements may be selected as input to the rule defined at step (b); and
storing an identification of the one or more data elements in the rules repository with the translated rule.

12. The computer-implemented method of claim 11 wherein the identification of the one or more data elements is stored in the metadata associated with the translated rule.

13. The computer-implemented method of claim 9 wherein the request comprises the first rule.

14. The computer-implemented method of claim 1, wherein the predetermined criteria is an identification of one of a plurality of predetermined environments, wherein each environment comprises an association of one or more applications with a predetermined function, and wherein the application of the predetermined criteria at step (c) comprises associating the rule defined at step (b) with one of the plurality of environments.

15. A non-transitory electronic device readable storage medium storing electronic device readable instructions for facilitating communication between one or more applications and one or more rules engines, the instructions causing one or more processors to:

a. provide a platform protocol including a platform syntax for defining a rule, the platform protocol comprising an association between predetermined criteria relating to the rule and predetermined one or more rules engines;

b. define one or more rules according to the platform syntax, wherein each rule of the one or more rules is associated with metadata;

c. associate a rule defined at (b) with a rules engine of the predetermined one or more rules engines based on application of the predetermined criteria to the rule defined at (b), wherein the association of the rule defined at (b) with the rules engine of the predetermined one or more rules engines is stored in the metadata associated with the rule defined at (b);

d. translating the rule associated at (c) into a rules engine syntax for the rules engine of the predetermined one or more rules engines; and e. storing the translated rule and its associated metadata in a rules repository.

16. The medium of claim 15 further comprising instructions for:
receiving a request from one of the applications to execute a first rule;
retrieving metadata associated with the first rule;
retrieving the translated rule for the first rule;
identifying the rules engine associated at (d) with the first rule by the retrieved metadata associated with the first rule; and
transmitting the translated rule to the rules engine associated with the first rule.

17. The medium of claim 16 further comprising instructions for receiving a result from the rules engine associated with the first rule and transmitting the result to the one application.

18. The medium of claim 16 wherein the request comprises the first rule.

19. A system for facilitating communication between one or more applications and one or more rules engines, system comprising:
a storage medium for storing a rules repository; and
one or more processors for:

a. providing a platform protocol including a platform syntax for defining a rule, the platform protocol comprising an association between predetermined criteria relating to the rule and predetermined one or more rules engines;

b. defining one or more rules according to the platform syntax, wherein each rule of the one or more rules is associated with metadata;

c. associating a rule defined at (b) with a rules engine of the predetermined one or more rules engines based on application of the predetermined criteria to the rule defined at step (b), wherein the association of the rule defined at (b) with the rules engine of the predetermined one or more rules engines is stored in the metadata associated with the rule defined at (b);

d. translating the rule associated in step (c) into a rules engine syntax for the rules engine of the predetermined one or more rules engines; and e. storing the translated rule and its associated metadata in the rules repository.

20. The system of claim 19, wherein the one or more processors further:
   receives a request from one of the applications to execute a first rule;
   retrieves metadata associated with the first rule;
   retrieves the translated rule for the first rule;
   identifies the rules engine associated at (d) with the first rule by the retrieved metadata associated with the first rule; and
   transmits the translated rule to the predetermined rules engine.

21. The system of claim 20, wherein the one or more processors receives a result from the rules engine associated with the first rule and transmits the result to the one application.

22. The system of claim 20, wherein the request comprises the first rule.

* * * * *